(12) United States Patent
Gurreri et al.

(10) Patent No.: US 9,575,263 B2
(45) Date of Patent: Feb. 21, 2017

(54) OPTICAL FIBER CONNECTION SYSTEM INCLUDING OPTICAL FIBER ALIGNMENT DEVICE

(71) Applicants: TYCO ELECTRONICS CORPORATION, Berwyn, PA (US); TYCO ELECTRONICS RAYCHEM BVBA, Kessel-Lo (BE)

(72) Inventors: Michael Gurreri, York, PA (US); Robert Charles Flaig, Lancaster, PA (US); Randall Bobby Paul, Elizabethville, PA (US); Danny Willy August Verheyden, Gelrode (BE); David Donald Erdman, Hummelstown, PA (US); Dwight A. Bretz, Hummelstown, PA (US)

(73) Assignee: COMSCOPE TECHNOLOGIES LLC, Hickory, NC (US)

( * ) Notice: Subject to any disclaimer, the term of this patent is extended or adjusted under 35 U.S.C. 154(b) by 75 days.

(21) Appl. No.: 14/377,189

(22) PCT Filed: Feb. 6, 2013

(86) PCT No.: PCT/EP2013/052345
§ 371 (c)(1),
(2) Date: Aug. 7, 2014

(87) PCT Pub. No.: WO2013/117598
PCT Pub. Date: Aug. 15, 2013

(65) Prior Publication Data
US 2016/0018604 A1  Jan. 21, 2016

Related U.S. Application Data

(60) Provisional application No. 61/596,035, filed on Feb. 7, 2012, provisional application No. 61/758,021, filed on Jan. 29, 2013.

(51) Int. Cl.
*G02B 6/36* (2006.01)
*G02B 6/38* (2006.01)

(52) U.S. Cl.
CPC .......... *G02B 6/3882* (2013.01); *G02B 6/3806* (2013.01); *G02B 6/3809* (2013.01); *G02B 6/3821* (2013.01);
(Continued)

(58) Field of Classification Search
CPC ... G02B 6/3825; G02B 6/3821; G02B 6/3846; G02B 6/3874; G02B 6/3881; G02B 6/3806; G02B 6/3865; G02B 6/3882
(Continued)

(56) References Cited

U.S. PATENT DOCUMENTS 3,923,371 A   12/1975  Dalgleish
4,088,386 A    5/1978  Hawk
(Continued)

FOREIGN PATENT DOCUMENTS

EP   2 549 313   1/2013
EP   2 549 314   1/2013
(Continued)

OTHER PUBLICATIONS

3M VF-45 Fiber Optic Connector Quick Install Kit Instructions. (Jan. 2004) 32 pages.
(Continued)

*Primary Examiner* — Kaveh C Kianni
*Assistant Examiner* — Hung Lam
(74) *Attorney, Agent, or Firm* — Merchant & Gould P.C.

(57) ABSTRACT

The present disclosure relates to an optical fiber alignment device that has an alignment housing that includes first and second ends. The alignment housing defines a fiber insertion axis that extends through the alignment housing between the first and second ends. The alignment housing includes a fiber
(Continued)

alignment region at an intermediate location between the first and second ends. First and second fiber alignment rods are positioned within the alignment housing. The first and second fiber alignment rods cooperate to define a fiber alignment groove that extends along the fiber insertion axis. The first and second fiber alignment rods each having rounded ends positioned at the first and second ends of the alignment housing.

19 Claims, 37 Drawing Sheets

(52) U.S. Cl.
CPC ........... *G02B 6/3825* (2013.01); *G02B 6/3846* (2013.01); *G02B 6/3865* (2013.01); *G02B 6/3893* (2013.01)

(58) Field of Classification Search
USPC .............................. 385/58, 62–66, 81–84, 87
See application file for complete search history.

(56) References Cited

U.S. PATENT DOCUMENTS

| | | | |
|---|---|---|---|
| 4,201,444 A | 5/1980 | Arnold et al. | |
| 4,490,007 A | 12/1984 | Murata | |
| 4,730,892 A | 3/1988 | Anderson et al. | |
| 4,964,689 A | 10/1990 | Wichansky | |
| 4,973,126 A | 11/1990 | Degani et al. | |
| 5,348,487 A | 9/1994 | Marazzi et al. | |
| 6,142,676 A | 11/2000 | Lu | |
| 6,457,873 B1 | 10/2002 | Heier et al. | |
| 6,516,131 B1 | 2/2003 | Tullis | |
| 7,874,738 B2 | 1/2011 | Lu | |
| 2009/0087151 A1 | 4/2009 | Benjamin et al. | |
| 2010/0129032 A1 | 5/2010 | Riley et al. | |

FOREIGN PATENT DOCUMENTS

| | | |
|---|---|---|
| FR | 2 282 650 | 3/1976 |
| FR | 2 528 587 | 12/1983 |
| WO | WO 2012/112344 | 8/2012 |

OTHER PUBLICATIONS

3M Volition VF-45 Interconnect an Emerging Standard for High-Speed Fiber to the Desktop. 18 pages. (admitted prior art).
MOLEX—Termination Procedure for Optoclip Connection Elements. 86790-0002 Rev. A. (1995) 10 pages.
Ohtsuka et al. "Non-fixed Fiber-Portion-Compressed Type Multi-fiber PC Optical Connector."
Optical Connectors: Optoclip II Series for multimode fibers connector OC II. (1997) 4 pages.
Optical Connectors: Optoclip II Series for singlemode fibers connector OC II. (1997) 4 pages.
Relais Electronics Deutsch—Activite Fibre Optique: Procedure de mise en oeuvre et de cablage de l'Optoclip II Monomode. (1995) 14 pages.
Suhner Fiberoptic Optoclip II Bare Fibre Adapter. Huber& Suhner AG. www.hubersuhner.com. (2000) 2 pages.
Suhner Fiberoptic Power Point. 23 pages.(admitted prior art).

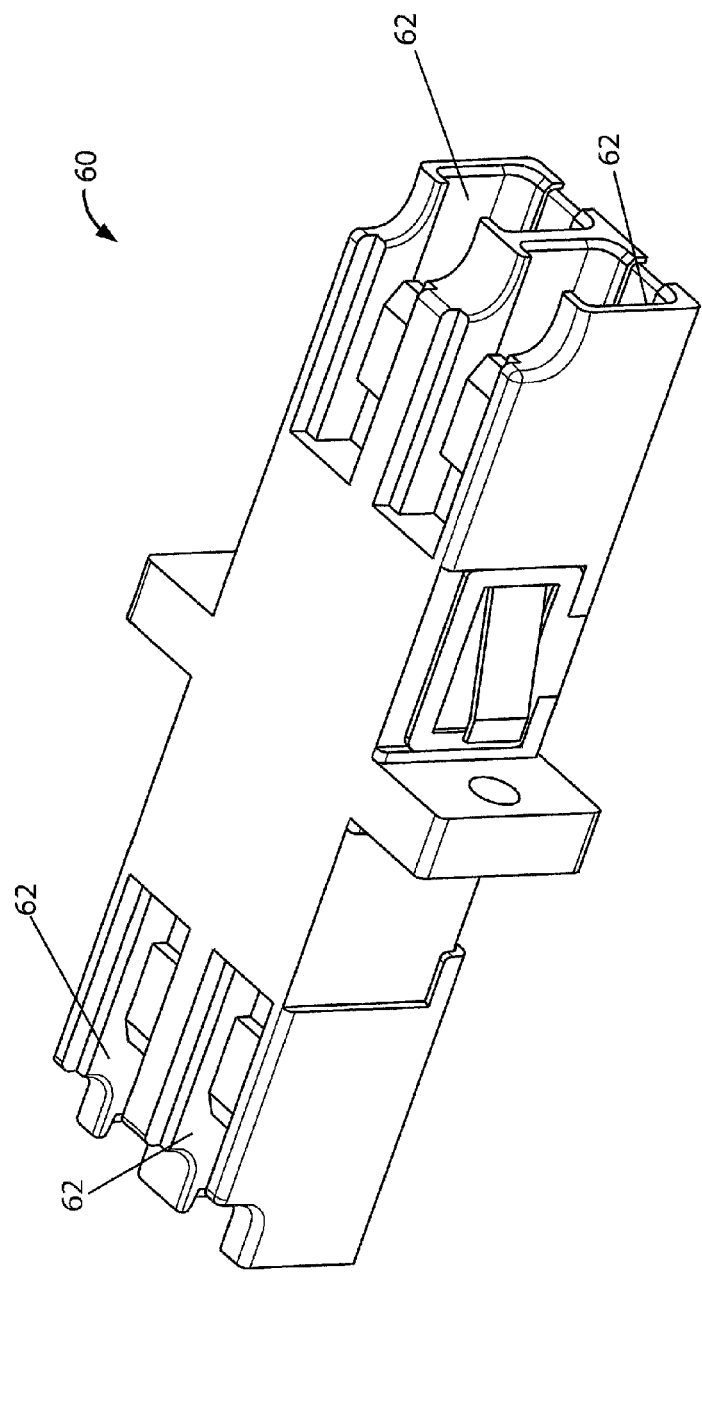
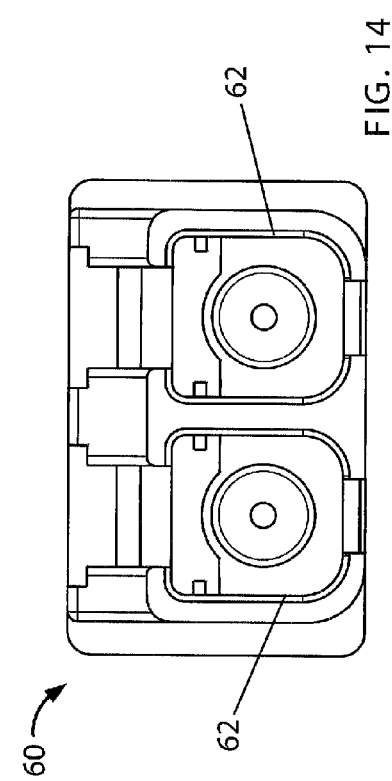
FIG. 13
FIG. 14

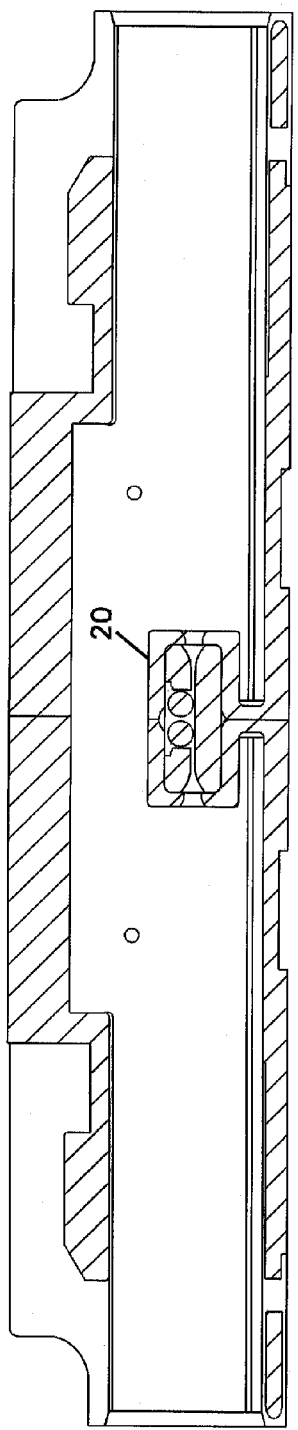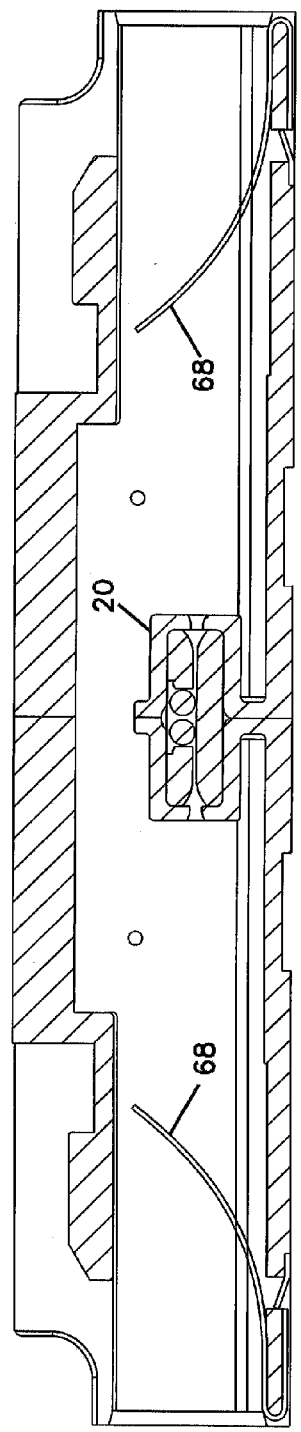
FIG. 17
FIG. 18

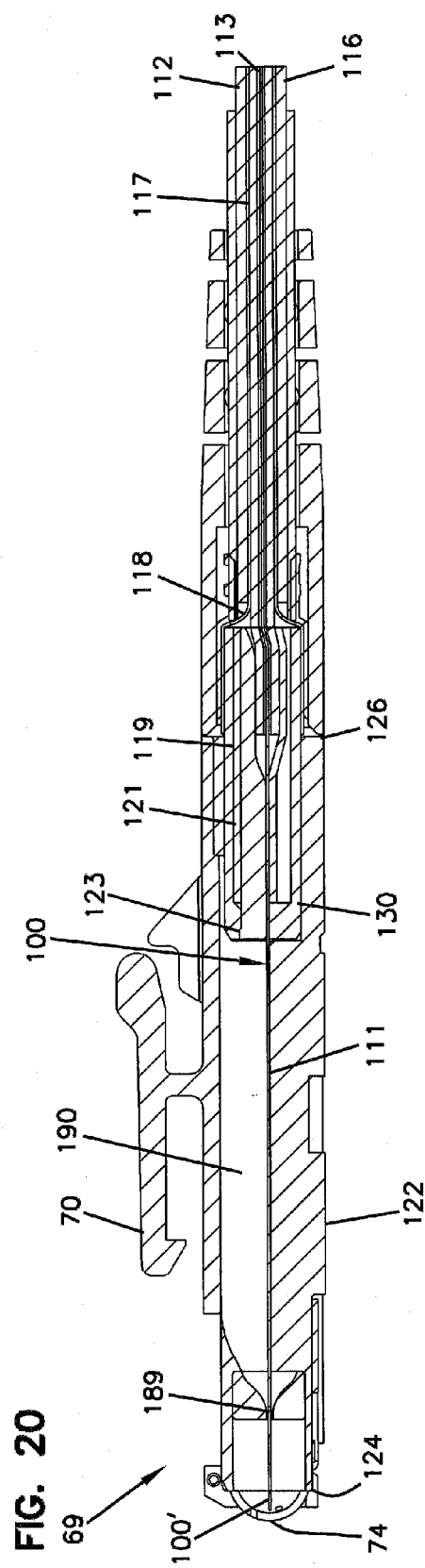
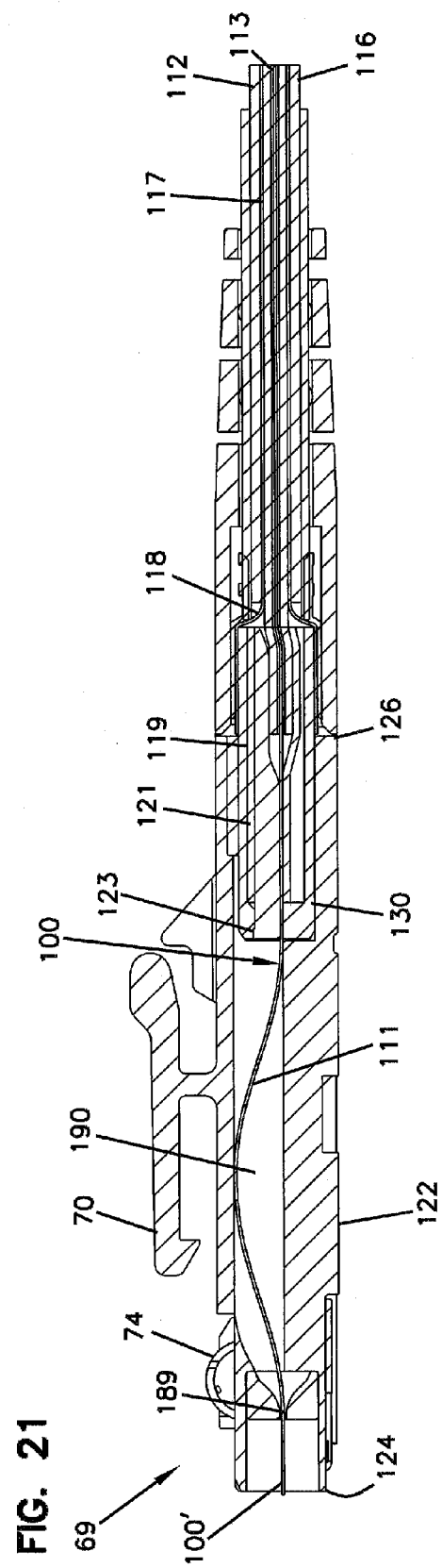

OPTICAL FIBER CONNECTION SYSTEM INCLUDING OPTICAL FIBER ALIGNMENT DEVICE

This application is a National Stage Application of PCT/EP2013/052345, filed 6 Feb. 2013, which claims benefit of U.S. Provisional Ser. No. 61/596,035, filed 7 Feb. 2012 and U.S. Provisional Ser. No. 61/758,021, filed 29 Jan. 2013 and which applications are incorporated herein by reference. To the extent appropriate, a claim of priority is made to each of the above disclosed applications.

TECHNICAL FIELD

The present disclosure relates to optical fiber connection systems and to devices and methods for aligning two fibers end-to-end.

BACKGROUND

Modern optical devices and optical communications systems widely use fiber optic cables. Optical fibers are strands of glass fiber processed so that light beams transmitted through the glass fiber are subject to total internal reflection wherein a large fraction of the incident intensity of light directed into the fiber is received at the other end of the fiber.

Many approaches to achieve fiber alignment can be found in the prior art, among them are V-grooves and ferrules. Ferrule based alignment systems including include ferruled connectors which use cylindrical plugs (referred to as ferrules) that fit within an alignment sleeve (e.g., a cylindrical split sleeve with elastic characteristics) to perform fiber alignment. Precision holes are drilled or molded through the centers of the ferrules. Optical fibers are secured (e.g., potted) within the precision holes with polished ends of the optical fibers located at end faces of the ferrules. Precise fiber alignment depends on the accuracy of the central hole of each ferrule. Fiber alignment occurs when two ferrules are inserted into an alignment sleeve such that the end faces of the ferrules oppose one another and the optical fibers supported by the ferrules are co-axially aligned with one another. Normally, ferruled connectors use ceramic or metal ferrules in which the precision center holes are drilled. Disadvantageously, drilling of such a central hole that is accurate enough for aligning can be difficult. In addition, a connector containing a ferrule has very high manufacturing costs. Therefore looking for adequate alignment solutions containing ferrule-less connectors would be more desirable.

V-grooves are commonly used in prior-art ferrule-less fiber optic alignment devices. An example is the V-groove method described in U.S. Pat. No. 6,516,131 used for alignment of optical fiber ends. The V-groove is uni-directionally or bi-directionally tapered for enabling easy positioning of the fibers. Optical fibers are pressed into the V-grooves and line contact between the optical fibers and the surfaces of the V-grooves assists in providing precise alignment of the optical fibers. In one example, two optical fibers desired to be optically connected together are positioned end-to-end within a V-groove such that the V-groove functions to co-axially align the optical fibers. End faces of the aligned optical fibers can abut one another.

SUMMARY

One aspect of the present disclosure relates to a device and method for aligning two fibers end-to-end. Co-axial alignment can be provided between the optical fibers of two fiber optic connectors so as to provide an optical coupling between the optical fibers. In such an embodiment, the optical connectors can be ferrule-less optical connectors. Co-axial alignment can also be provided between the end of an optical fiber of a fiber optic cable and a stub end of an optical fiber supported by a ferrule. In certain embodiments, fiber alignment devices in accordance with the principles of the present disclosure can accurately align optical fiber while using a minimal number of parts to reduce cost and facilitate assembly.

The term "fiber" as used herein relates to a single, optical transmission element having a core usually having a diameter of 8-12 µm and a cladding usually having a diameter of 120-130 µm, wherein the core is the central, light-transmitting region of the fiber, and the cladding is the material surrounding the core to form a guiding structure for light propagation within the core. The core and cladding can be coated with a primary coating usually comprising one or more organic or polymer layers surrounding the cladding to provide mechanical and environmental protection to the light-transmitting region. The primary coating may have a diameter ranging e.g. between 200 and 300 µm. The core, cladding and primary coating usually are coated with a secondary coating, a so-called "buffer", a protective polymer layer without optical properties applied over the primary coating. The buffer or secondary coating usually has a diameter ranging between 300-1100 µm, depending on the cable manufacturer.

The term "light" as used herein relates to electromagnetic radiation, which comprises a part of the electromagnetic spectrum that is classified by wavelength into infrared, the visible region, and ultraviolet.

Index matching gel can be used with alignment devices in accordance with the principles of the present disclosure to improve the optical connection between the open light transmission paths of the first and second optical fibers. The index matching gel preferably has an index of refraction that closely approximates that of an optical fiber is used to reduce Fresnel reflection at the surface of the bare optical fiber ends. Without the use of an index-matching material, Fresnel reflections will occur at the smooth end faces of a fiber and reduce the efficiency of the optical connection and thus of the entire optical circuit.

BRIEF DESCRIPTION OF THE DRAWINGS

FIG. 13 is a perspective view of a duplex fiber optic adapter in which two optical fiber alignment devices of the type shown at FIG. 1 have been incorporated;

FIG. 14 is an end view of the duplex fiber optic adapter of FIG. 13;

FIGS. 17 and 18 show a simplex fiber optic adapter in which one of the optical fiber alignment devices of FIG. 1 has been incorporated;

FIG. 20 illustrates a fiber optic connector in a non-connected state;

FIG. 21 illustrates the fiber optic connector of FIG. 20 in a connected state;

DETAILED DESCRIPTION

FIGS. 1-10 illustrate an optical fiber alignment device 20 in accordance with the principles of the present disclosure. The optical fiber alignment device 20 is used to coaxially align and optically connect together two optical fibers such that optical transmissions can be conveyed from optical fiber to optical fiber. When first and second optical fibers are inserted into opposite ends of the optical fiber alignment device 20 along a fiber insertion axis 22, the optical fibers are guided to an orientation in which the optical fibers are coaxially aligned with one another with end faces of the optical fibers abutting or in close proximity to one another. A mechanism can be provided within the optical fiber alignment device 20 for mechanically retaining the optical fibers in an optically connected orientation. Thus, the optical fiber alignment device 20 functions to provide a mechanical splice between the optical fibers inserted therein. In certain embodiments, an index matching gel can be provided within the optical fiber alignment device 20 for enhancing the optical coupling between the aligned optical fibers retained within the optical fiber device 20.

Figure 1:
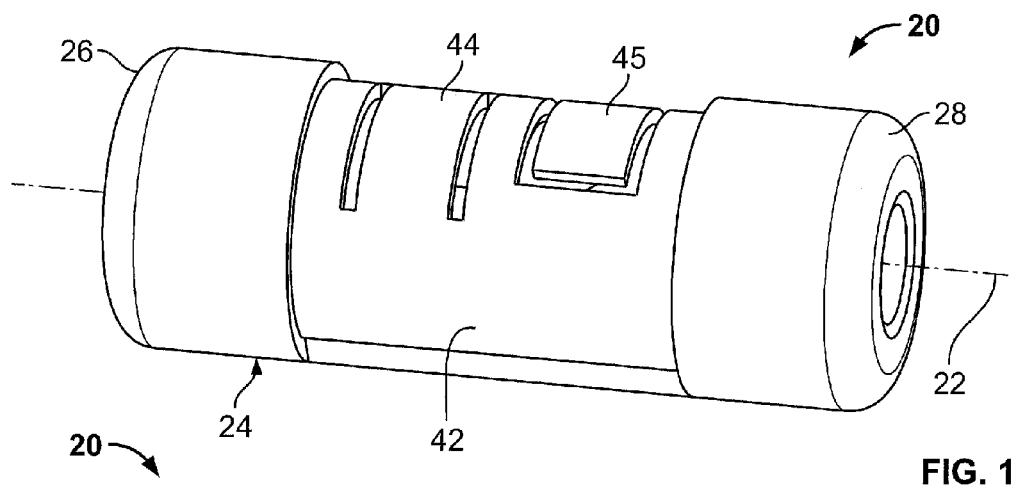
FIG. 1 is a perspective view of an optical fiber alignment device in accordance with the principles of the present disclosure.
Figure 2:
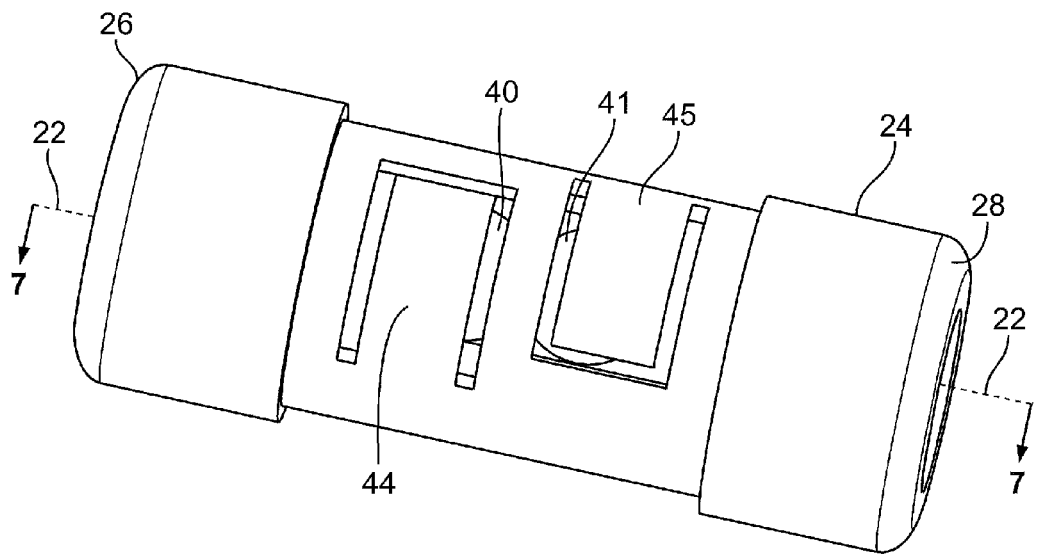
FIG. 2 is another perspective view of the optical fiber alignment device of FIG. 1.
Figure 3:
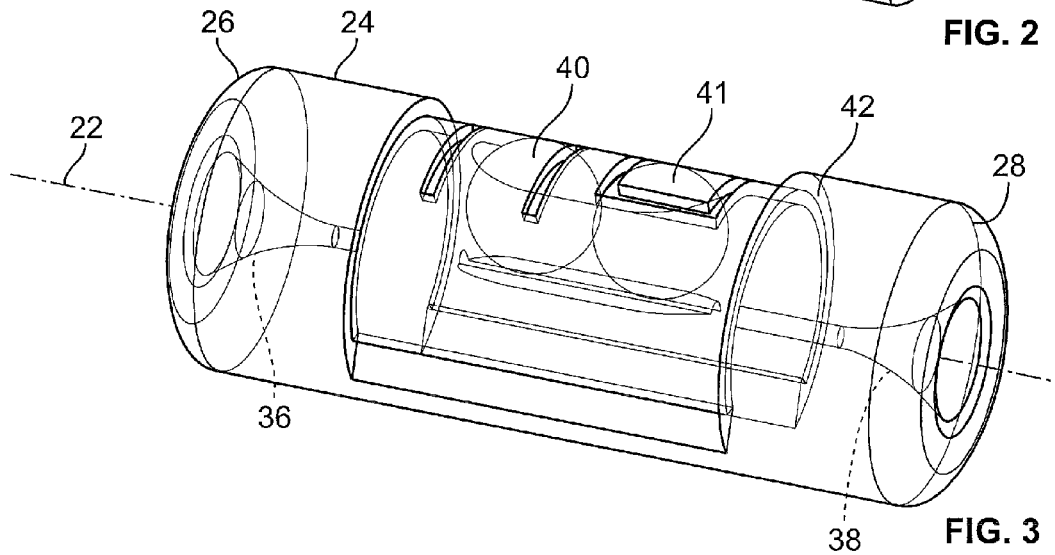
FIG. 3 is a further perspective view of the optical fiber alignment device of FIG. 1.
Figure 4:
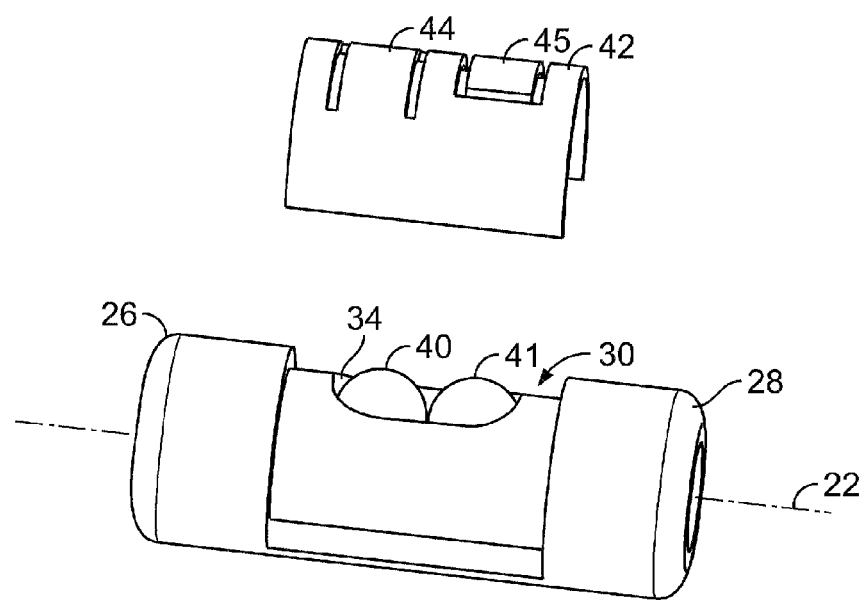
FIGS. 4-6 are exploded views of the optical fiber alignment device of FIG. 1.
Figure 5:
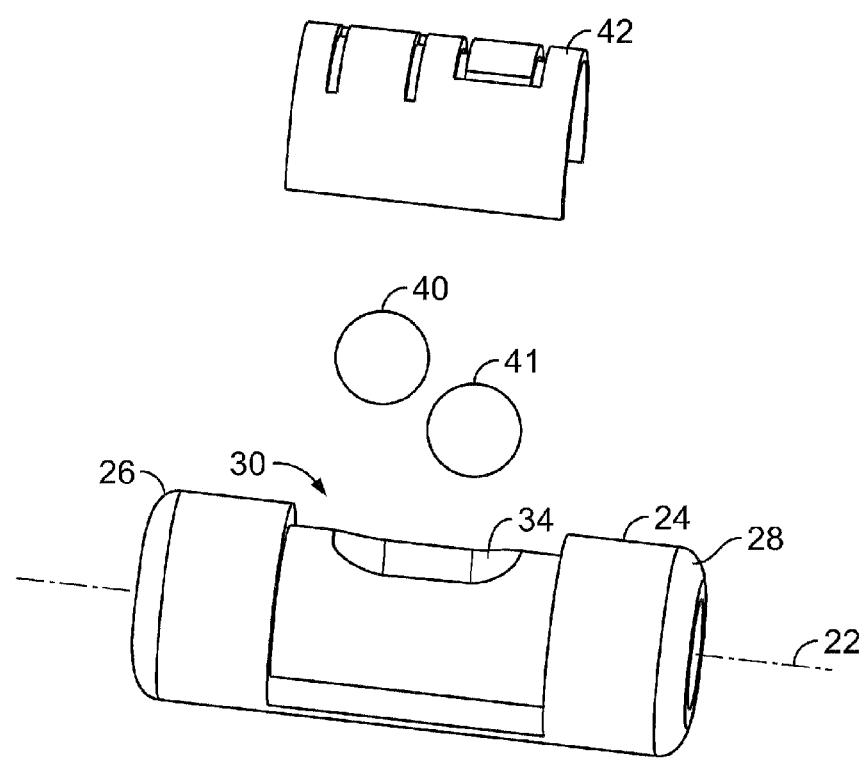
Figure 6:
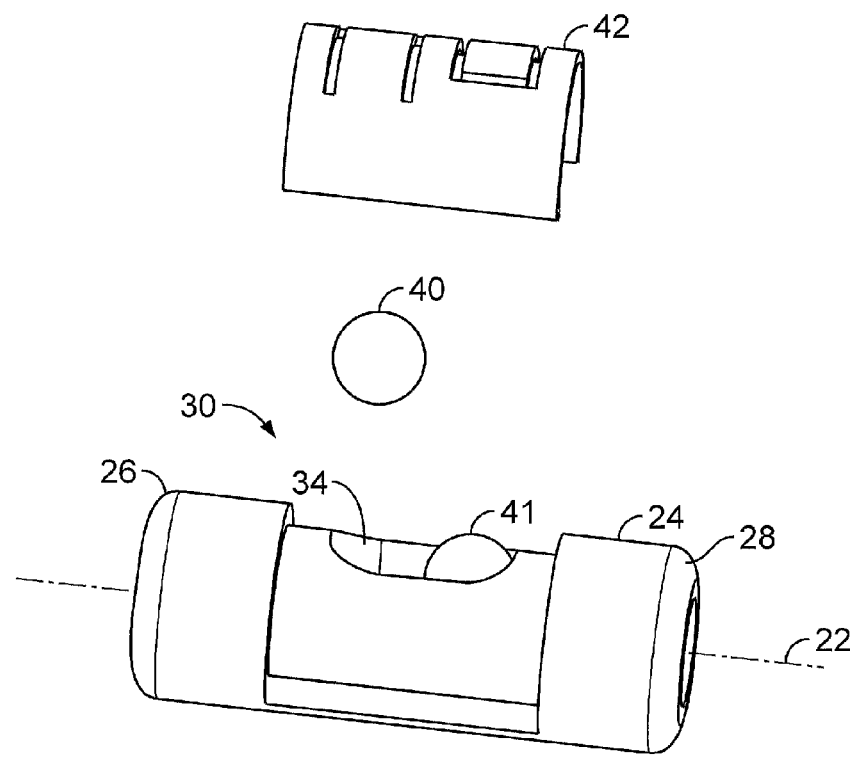
Figure 7:
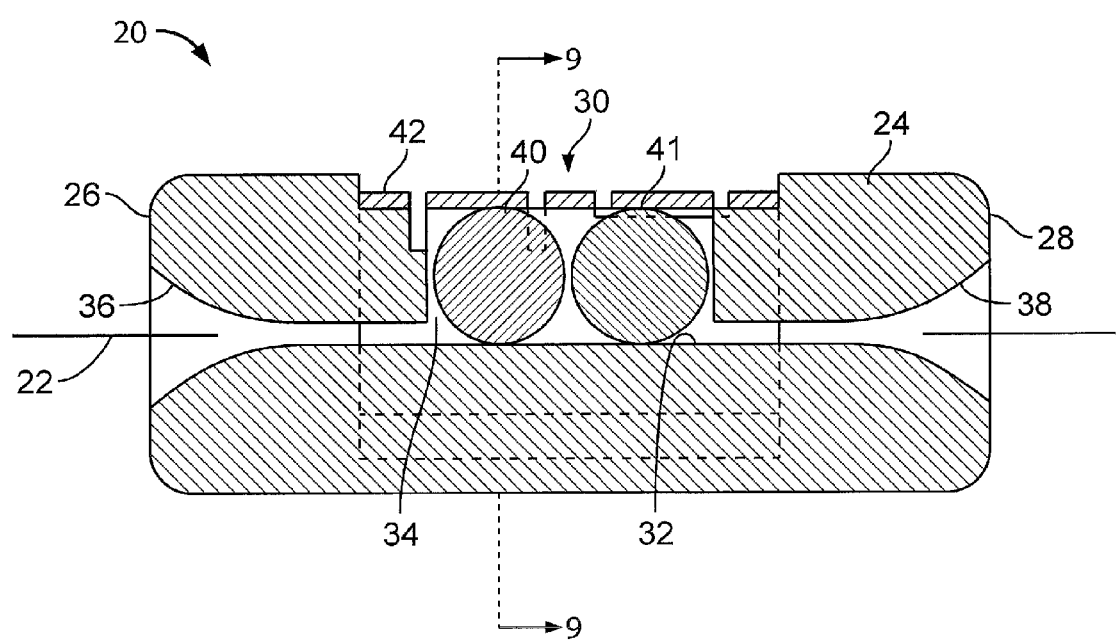
FIG. 7 is a cross-sectional view taken along section line 7-7 of FIG. 2.
Figure 8:
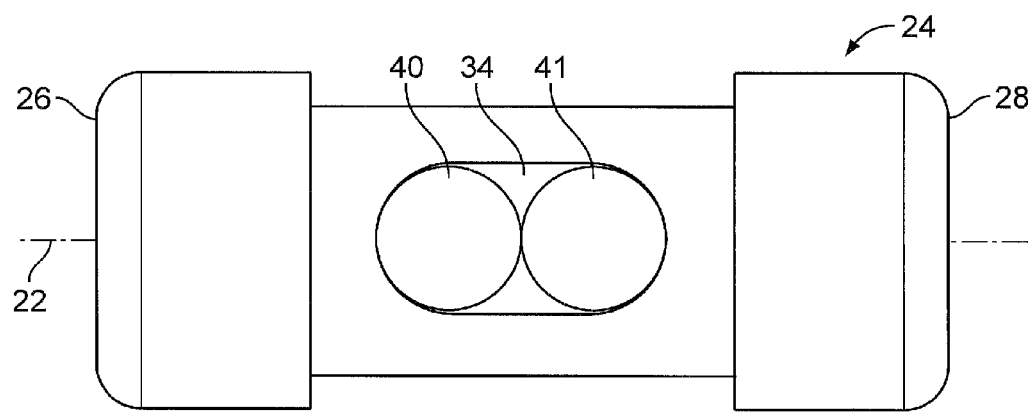
FIG. 8 is a top view of the optical fiber alignment device of FIG. 1 with a clip of the optical fiber alignment device removed.

Referring to FIGS. 1-10, the optical fiber alignment device 20 includes an alignment housing 24 (e.g., a molded plastic housing) including first and second ends 26, 28. The alignment housing 24 defines a fiber insertion axis 22 that extends through the alignment housing 24 between the first and second ends 26, 28. As shown at FIG. 7, the alignment housing 24 includes a fiber alignment region 30 at an intermediate location between the first and second ends 26, 28. The fiber alignment region 30 includes an alignment groove 32 that extends along the fiber insertion axis 22. The alignment housing 24 also defines a pocket 34 at the fiber alignment region 30 adjacent to the alignment groove 32. The first end of the alignment housing 26 includes a first funnel 36 that extends along the fiber insertion axis 22 for guiding a first optical fiber (e.g., see the left optical fiber 100 at FIG. 19) into the fiber alignment region 30. The second end 28 of the alignment housing 24 includes a second funnel 38 that extends along the fiber insertion axis 22 for guiding a second optical fiber (e.g., see the right optical fiber 100 at FIG. 19) into the fiber alignment region 30. The first and second funnels 36, 38 are configured to taper inwardly toward the fiber insertion axis 22 as the first and second funnels 36, 38 extend into the alignment housing 24 toward the fiber alignment region 30. The tapered configuration of the funnels 36, 38 functions to guide the first and second optical fibers into coaxial alignment with the fiber insertion axis 22 such that the optical fibers can be easily slid into registration with the alignment groove 32.

Figure 9:
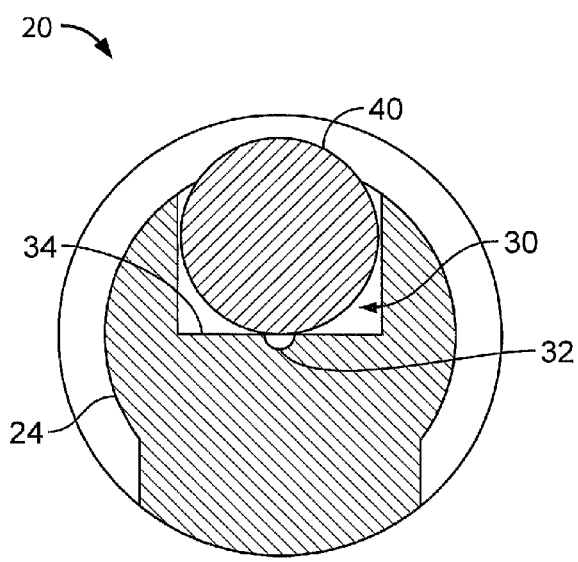
FIG. 9 is a cross-sectional view taken along section line 9-9 of FIG. 7 with the clip removed.
Figure 10:
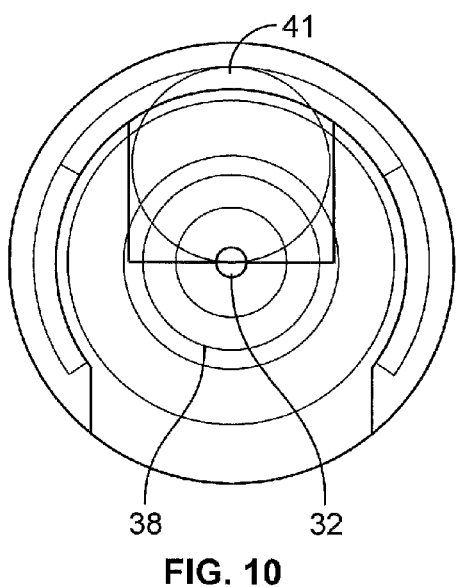
FIG. 10 is an end view of the optical fiber alignment device of FIG. 1.

When the first and second optical fibers are inserted into the alignment housing 24 along the fiber insertion axis 22, alignment between the optical fibers is provided by the alignment groove 32. In certain embodiments, the alignment groove 32 can have a curved transverse cross-sectional shape (e.g., a semi-circular transverse cross-sectional shape as shown at FIG. 9) and can be configured to receive the optical fibers therein such that the optical fibers seat within the alignment groove 32. In such an embodiment, it will be appreciated that the transverse cross-sectional shape of the alignment groove 32 complements the outer diameters of the optical fibers. In alternative embodiments, the alignment groove can have a transverse cross-sectional shape that is generally v-shaped (i.e., the alignment groove 32 can be a v-groove). In such an embodiment, the v-groove provides two lines of contact with each of the optical fibers inserted therein. In this way, the line/point contact with the v-groove assists in providing accurate alignment of the optical fibers.

It will be appreciated that the optical fibers inserted within the optical fiber alignment device 20 are preferably preprocessed. For example, in certain embodiments, coatings of the optical fibers can be stripped from end portions of the optical fiber such that bare glass portions of the optical fibers are inserted within the fiber alignment region 30. In such embodiments, the alignment groove 32 is configured to receive the bare glass portions of the optical fibers. In one embodiment, the bare glass portions can have diameters ranging from 120-130 microns and can be formed by glass cladding layers that surround glass cores.

The optical fiber alignment device 20 further includes structure for urging the optical fibers into contact with the fiber alignment groove 32. In the depicted embodiment, the fiber optic alignment device 20 includes first and second balls 40, 41 (i.e., fiber contact members) positioned within the pocket 34. The pocket 34 has an elongate direction that extends along the fiber insertion axis 22 and the pocket 34 functions to align the balls 40, 41 (e.g., spheres) along the fiber insertion axis 22. The optical fiber alignment device 20 further includes a biasing arrangement for urging the balls 40, 41 generally toward the alignment groove 30. For example, the biasing arrangement can urge the balls 40, 41 in a direction transverse with respect to the fiber insertion axis 22. In the depicted embodiment, the biasing arrangement is shown including a clip 42 (e.g., a metal clip having elastic properties) mounted (e.g., snap fitted) over the alignment housing 24 adjacent the fiber alignment region 30. The clip 42 has a transverse cross-sectional profile that is generally C-shaped. When the clip 42 is snapped over the alignment housing 24, the clip 42 functions to capture the balls 40, 41 within the pocket 34. The clip 42 includes biasing structures such as first and second springs 44, 45 for respectively biasing the balls 40, 41 toward the alignment groove 32. As depicted, the springs 44, 45 are leaf springs having a cantilevered configuration with a base end integrally formed with a main body of the clip 42 and free ends that are not connected to the main body of the clip 42. In the depicted embodiment, the first spring 44 extends (e.g., curves) from its base end to its free end in a generally clockwise direction around the axis 22 and the second spring 45 extends (e.g., curves) from its base end to its free end in a generally counterclockwise direction around the axis 22. The springs 44, 45 are defined by cutting or slitting the clip 42 so as to define slots in the clip 42 that surround three sides of each of the springs 44, 45.

Figure 11:
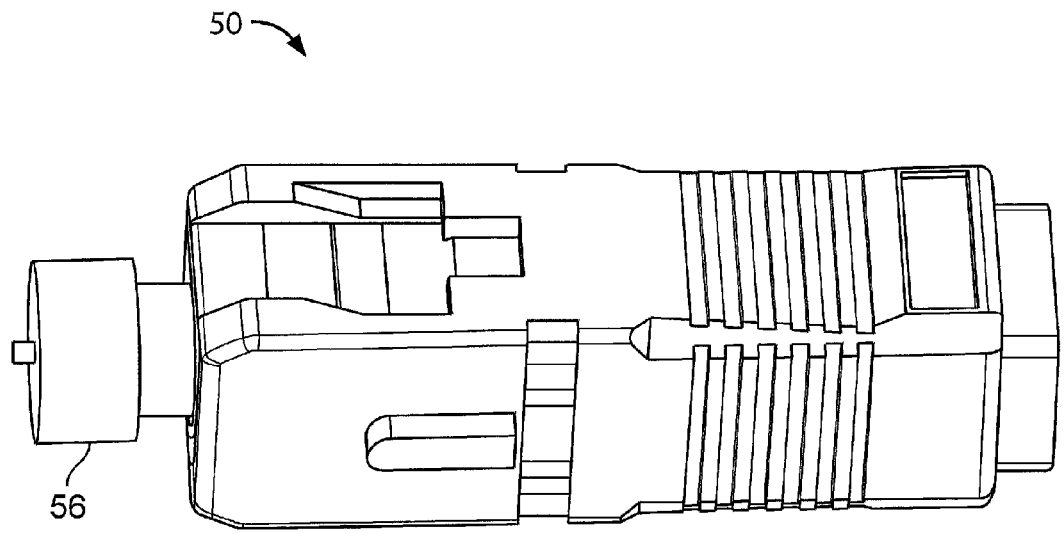
FIGS. 11 and 12 show a connector in which the optical fiber alignment device of FIG. 1 has been incorporated.
Figure 12:
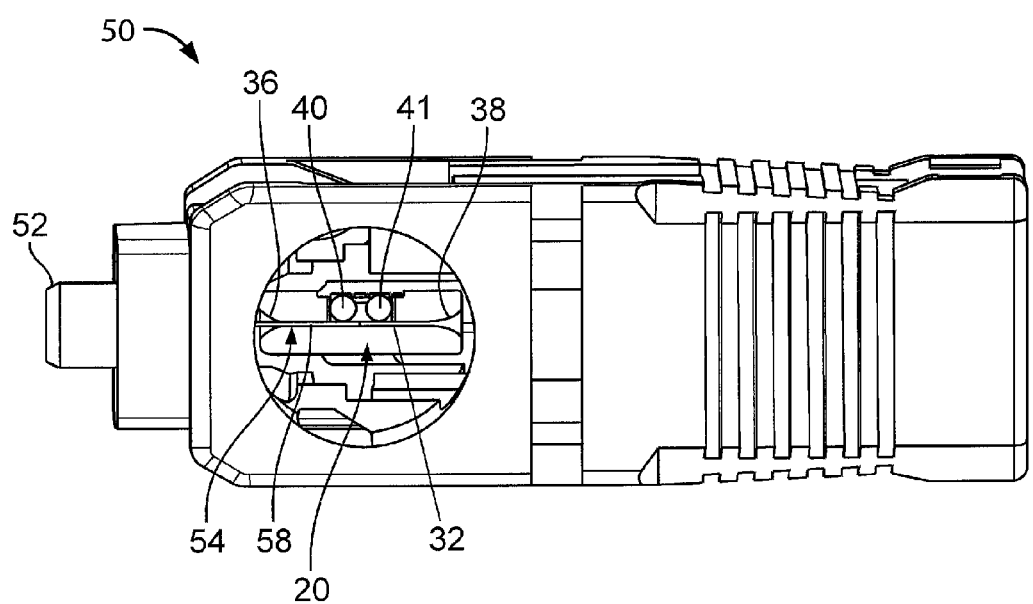
Figure 15:
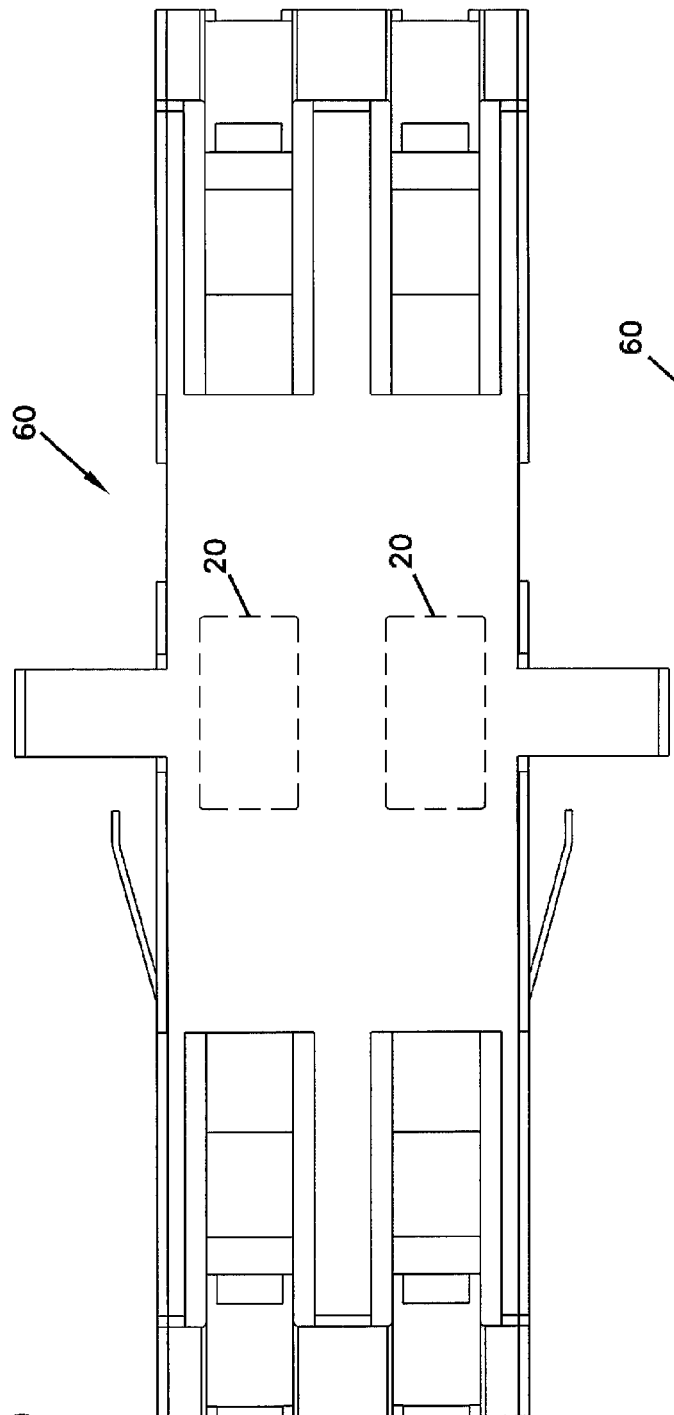
FIG. 15 is a top view of the duplex fiber optic adapter of FIG. 13.
Figure 16:
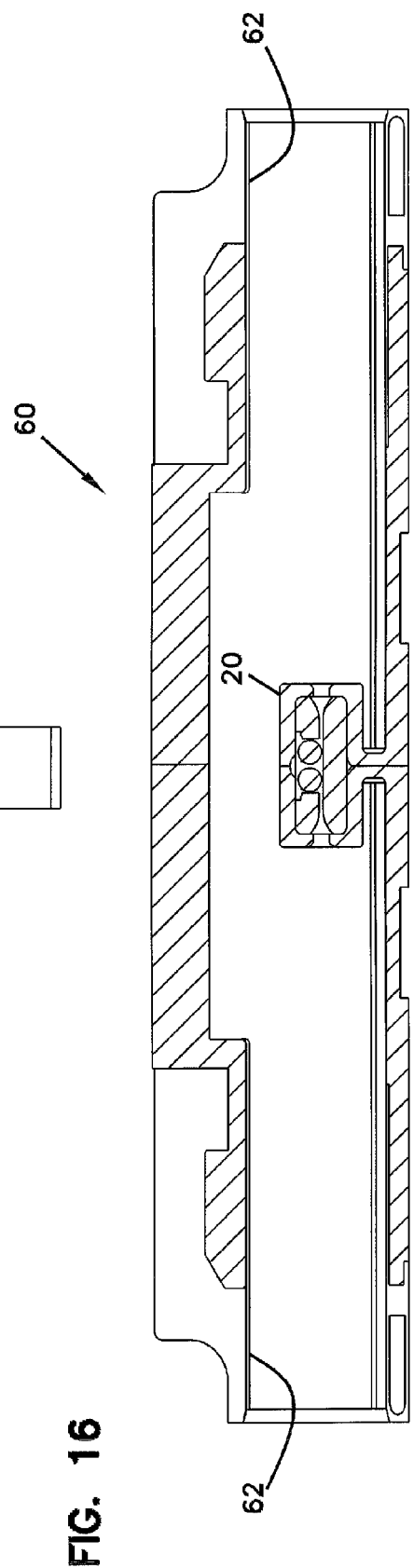
FIG. 16 is a cross-sectional view taken along section line 16-16 of FIG. 15.

FIGS. 11 and 12 show the optical fiber alignment device 20 incorporated into a fiber optic connector 50 such as an SC-connector. The connector 50 includes a ferrule 52 supporting an optical fiber 54. A dust cap 56 can be mounted over the interface end of the ferrule 52. The optical fiber 54 includes a stub end 58 that projects rearwardly from the ferrule 52 into the body of the connector 50. The stub end 58 is inserted within the first funnel 36 of the optical fiber alignment device 20 and is shown pressed within the fiber alignment groove 32 by the first ball 40. The connector 50 is optically connected to another fiber by inserting the fiber through the rear end of the connector 50 and into the second funnel 38. As the optical fiber is inserted into the second funnel 38, the optical fiber is guided into alignment with the fiber insertion axis 22. Continued insertion of the optical fiber causes the fiber to register with the fiber alignment groove 32 and displace the second ball 41 against the bias of the corresponding second spring 45. In this way, the spring biased balls 40, 41 assist in retaining the optical fibers in alignment along the alignment groove 32. In one embodiment, the connector 50 can have mechanical field splice capabilities in which the connector can be field spliced to an optical fiber by inserting the optical fiber through the rear end of the connector 50 and into the fiber alignment device 20.

FIGS. 13-16 illustrate a duplex fiber optic adapter 60 adapted for receiving and optically connecting two pairs of fiber optic connectors. In one embodiment, the connectors have an LP connector type profile/footprint. Two of the optical fiber alignment devices 20 are mounted within the duplex fiber optic adapter 60. When fiber optic connectors are inserted within coaxially aligned ports 62 of the fiber optic adapter 60, optical fibers of the fiber optic connectors enter the optical fiber alignment device 20 through the first and second funnels 36, 40 and are mechanically spliced at the fiber alignment region 30.

FIGS. 17 and 18 show simplex fiber optic adapters 64, 66 having the same basic configuration as the duplex fiber optic adapter 60. The simplex fiber optic adapters 64, 66 are the same except the simplex adapter 66 is provided with shutters 68. The shutters 68 flex open when fiber optic connectors are inserted into corresponding ports of the adapter 66. When no connectors are inserted in the adapter 66, the shutter 68 inhibits dust or other contaminants from entering the fiber alignment device 20 within the interior of the adapter 66.

Figure 19:
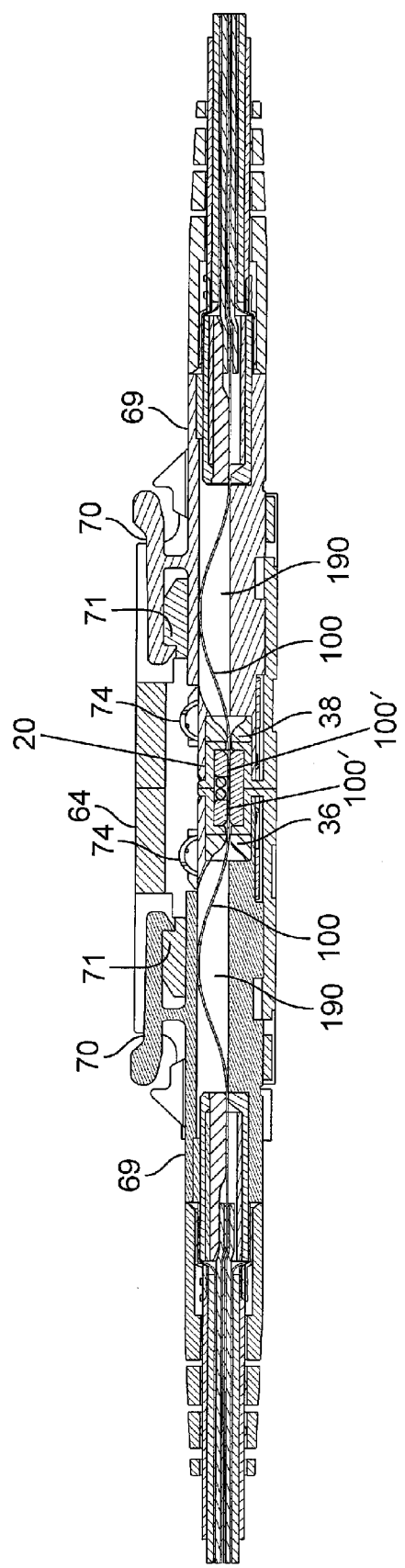
FIG. 19 shows the simplex fiber optic adapter of FIGS. 17 and 18 with fiber optic connectors inserted therein.

FIG. 19 shows the simplex fiber optic adapter 64 being used to optically and mechanically couple two fiber optic connectors 69. In one example, the fiber optic connectors 69 can have an LP-connector type footprint/profile/shape. The fiber optic connectors 69 include latches 70 (e.g., resilient cantilever style latches) that engage catches 71 of the fiber optic adapter 64. When the fiber optic connectors 69 are inserted within coaxially aligned ports of the fiber optic adapter 64, shutters 74 (see FIG. 20) of the fiber optic connectors 69 are retracted (see FIG. 21) thereby exposing ferrule-less free ends 100' of the optical fibers 100 of the fiber optic connectors 69. Continued insertion of the fiber optic connectors 69 into the ports of the fiber optic adapter 64 causes the end portions 100' of the optical fibers 100 to enter the optical fiber alignment device 20 through the first and second funnels 36, 38. The optical fibers 100 slide along the insertion axis 22 and are brought into registration with the fiber alignment groove 30. As the optical fibers 100 move along the fiber alignment groove 30, the optical fibers 100 force their corresponding balls 40, 41 away from the alignment groove 32 against the bias of the springs 44, 45. The optical fibers 100 slide along the alignment groove 32 until end faces of the optical fibers 100 are optically coupled to one another. In this configuration, the springs 44, 45 and the balls 40, 41 function to clamp or otherwise retain the optical fibers 100 in the optically coupled orientation.

The embodiments disclosed herein can utilize a dimensionally recoverable article such as a heat-recoverable tube/sleeve for securing/locking optical fibers at desired locations within the connector bodies and for attaching cable jackets and cable strength members to the connectors. A dimensionally recoverable article is an article the dimensional configuration of which may be made substantially to change when subjected to treatment. Usually these articles recover towards an original shape from which they have previously been deformed, but the term "recoverable" as used herein, also includes an article which adopts a new configuration even if it has not been previously deformed.

A typical form of a dimensionally recoverable article is a heat-recoverable article, the dimensional configuration of which may be changed by subjecting the article to heat treatment. In their most common form, such articles comprise a heat-shrinkable sleeve made from a polymeric material exhibiting the property of elastic or plastic memory as described, for example, in U.S. Pat. No. 2,027,962 (Currie); U.S. Pat. No. 3,086,242 (Cook et al); and U.S. Pat. No. 3,597,372 (Cook), the disclosures of which are incorporated herein by reference. The polymeric material has been cross-linked during the production process so as to enhance the desired dimensional recovery. One method of producing a heat-recoverable article comprises shaping the polymeric material into the desired heat-stable form, subsequently crosslinking the polymeric material, heating the article to a temperature above the crystalline melting point (or, for amorphous materials the softening point of the polymer), deforming the article, and cooling the article while in the deformed state so that the deformed state of the article is retained. In use, because the deformed state of the article is heat-unstable, application of heat will cause the article to assume its original heat-stable shape.

In certain embodiments, the heat-recoverable article is a sleeve or a tube that can include a longitudinal seam or can be seamless. In certain embodiments, the tube has a dual wall construction including an outer, heat-recoverable annular layer, and an inner annular adhesive layer. In certain embodiments, the inner annular adhesive layer includes a hot-melt adhesive layer.

In one embodiment, the heat-recoverable tube is initially expanded from a normal, dimensionally stable diameter to a dimensionally heat unstable diameter that is larger than the normal diameter. The heat-recoverable tube is shape-set to the dimensionally heat unstable diameter. This typically occurs in a factory/manufacturing setting. The dimensionally heat unstable diameter is sized to allow the heat-recoverable tube to be inserted over two components desired to be coupled together. After insertion over the two components, the tube is heated thereby causing the tube to shrink back toward the normal diameter such that the tube radially compresses against the two components to secure the two components together. The adhesive layer is preferably heat activated during heating of the tube.

According to one embodiment, the heat-recoverable tube may be formed from RPPM material that deforms to a dimensionally heat stable diameter generally at around 80° C. RPPM is a flexible, heat-shrinkable dual wall tubing with an integrally bonded meltable adhesive liner manufactured by Raychem. According to another embodiment, the heat-recoverable tube 56 may be formed from HTAT material that deforms to a dimensionally heat stable diameter generally at around 110° C. HTAT is a semi-flexible, heat-shrinkable tubing with an integrally bonded meltable adhesive inner lining designed to provide moisture proof encapsulation for a range of substrates, at elevated temperatures. HTAT is manufactured by Raychem from radiation cross-linked polyolefins. The inner wall is designed to melt when heated and is forced into interstices by the shrinking of the outer wall, so that when cooled, the substrate is encapsulated by a protective, moisture proof barrier. According to one embodiment, the heat-recoverable tube may have a 4/1 shrink ratio between the dimensionally heat unstable diameter and the normal dimensionally heat stable diameter.

Referring again to FIGS. 20 and 21, the fiber optic connector 69 is part of a fiber optic assembly that includes a fiber optic cable 112 terminated to the fiber optic connector 69. The fiber optic cable 112 includes the optical fiber 100, a buffer tube 117 (e.g., a buffer layer having an outer diameter ranging from 300-1100 microns) that surrounds the optical fiber 100, an outer jacket 116 and a strength layer 118 positioned between the buffer tube 117 and the outer jacket 116. The optical fiber 100 can also include a coating layer 113 that surrounds a bare glass portion 111. In one example, the coating layer 113 can have an outer diameter ranging from 230-270 microns and the bare glass portion 111 can have a cladding layer having an outer diameter ranging from 120-130 microns and a core having a diameter ranging from 5-15 microns. Other examples can have different dimensions. The strength layer 118 can provide tensile reinforcement to the cable 112 and can include strength members such as reinforcing aramid yarns. The fiber optic connector 69 includes a main connector body 122 having a front mating end 124 and a rear cable terminating end 126. An electrically conductive (e.g., metal) rear insert 130 is secured (e.g., press fit within) the rear cable terminating end 126 of the connector body 122. The optical fiber 100 extends from the fiber optic cable 112 forwardly through the main connector body 122 and has a ferrule-less end portion 100' that is accessible at the front mating end 124 of the connector body 122. Adjacent the rear cable terminating end 126 of the connector body 122, the optical fiber 100 is fixed/anchored against axial movement relative to the connector body 122. For example, the optical fiber 100 can be secured to a fiber securement substrate 119 by a shape recoverable article 121 (e.g., a heat shrink sleeve having an inner layer of hot melt adhesive). The fiber securement substrate 119 can be anchored within the rear insert 130. The rear insert 130 can be heated to transfer heat to the shape recoverable article thereby causing the shape recoverable article 121 to move from an expanded configuration to a fiber retaining configuration (e.g., a compressed configuration). The shape recoverable article 121 and the fiber securement substrate 119 function to anchor the optical fiber 100 against axial movement relative to the connector body 122. Thus, when an optical connection is being made, optical fiber cannot be pushed from inside the connector body 122 back into the fiber optic cable 112.

A fiber buckling region 190 (i.e., a fiber take-up region) is defined within the connector body 122 between the fiber anchoring location at the rear of the connector body 122 and the front mating end 124 of the connector body 122. When two connectors 69 are coupled together within one of the adapters 64 (as shown at FIG. 19), the end faces of the ferrule-less end portions 100' of the optical fibers 100 abut one another thereby causing the optical fibers 100 to be forced rearwardly into the connector bodies 122. As the optical fibers 100 are forced rearwardly into the connector bodies 122, the optical fibers 100 buckle/bend within the fiber buckling regions 190 (see FIGS. 19, 21 and 32) since the fiber anchoring location prevents the optical fiber 100 from being pushed back into the optical cable 112. The fiber buckling regions 190 are designed so that minimum bend radius requirements of the optical fibers 100 are not violated. In one example, the fiber buckling regions are sized to accommodate at least 0.5 millimeters or at least 1.0 millimeters of rearward axial movement of the optical fibers 100. In one embodiment, the fiber buckling regions 190 have lengths from 15-25 millimeters. Fiber alignment structures 189 can be provided at the front mating ends 124 of the connectors 69 for providing rough alignment of the ferrule-less end portions 100' along insertion axes of the connectors 69. In this way, the ferrule-less end portions 100' are positioned to slide into the first and second funnels 36, 38 of the alignment device 20 when the connectors 69 are inserted into a fiber optic adapter such as one of the adapters 60, 64 or 66. When the connector is loaded in the fiber optic adapter, the fiber buckling region 190 can be configured so that the optical fiber buckles generally along a plane (e.g., a vertical plane) that bisects the alignment slot 32. In this way, the compressive load on the optical fiber does not impart a lateral load on the fiber that could laterally displace the optical fiber from the alignment groove 32.

Referring still to FIGS. 20 and 21, the fiber securement substrate 119 can be loaded into the rear insert 130 through a front end of the rear insert 130. A front retention structure 123 (e.g., a flange, lip, tab or other structure) of the fiber securement substrate 119 can abut, mate with, interlock with or otherwise engage a front end of the insert 130. The rear insert 130 can be press fit within the rear end of the connector body. As used herein, the front end of the connector is the mating end where the ferrule-less end portion 100' is accessible, and the rear end of the connector is the end where the cable is attached to the connector body.

Figure 22:
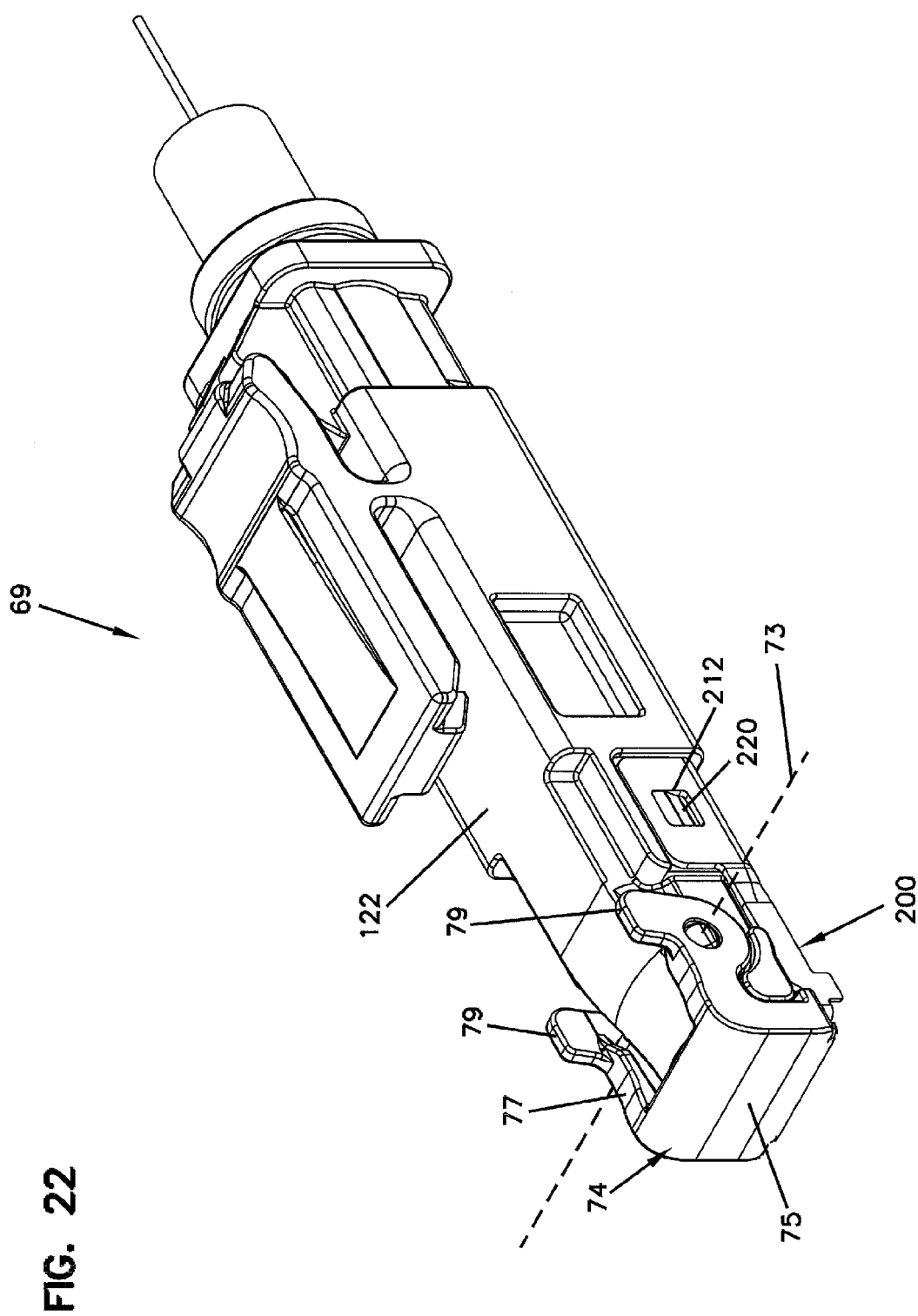
FIG. 22 is a front, top, perspective view of the fiber optic connector of FIG. 20 with a shutter of the fiber optic connector in a closed position.
Figure 23:
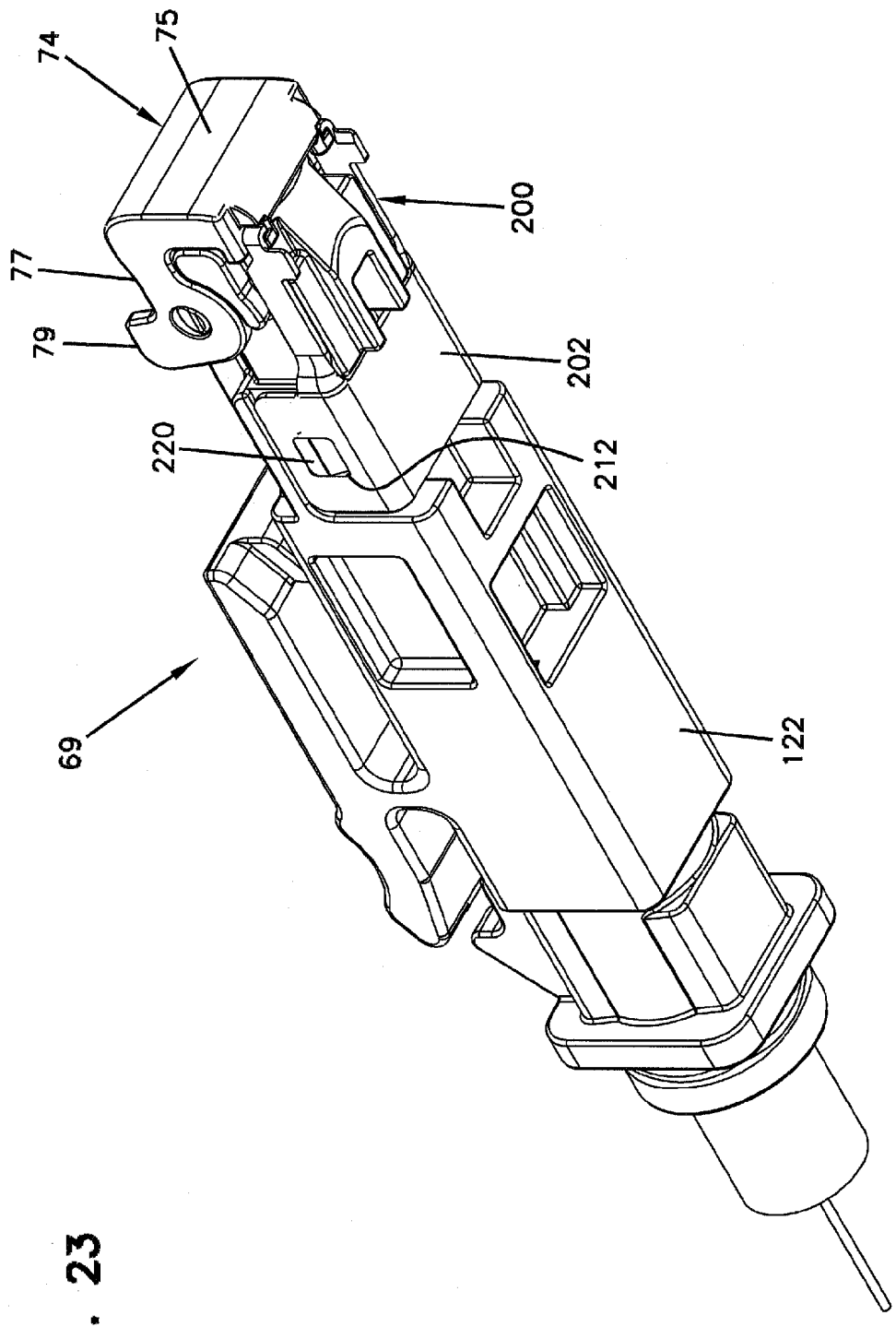
FIG. 23 is a front, bottom, perspective view of the fiber optic connector of FIG. 22 with the shutter in the closed position.
Figure 24:
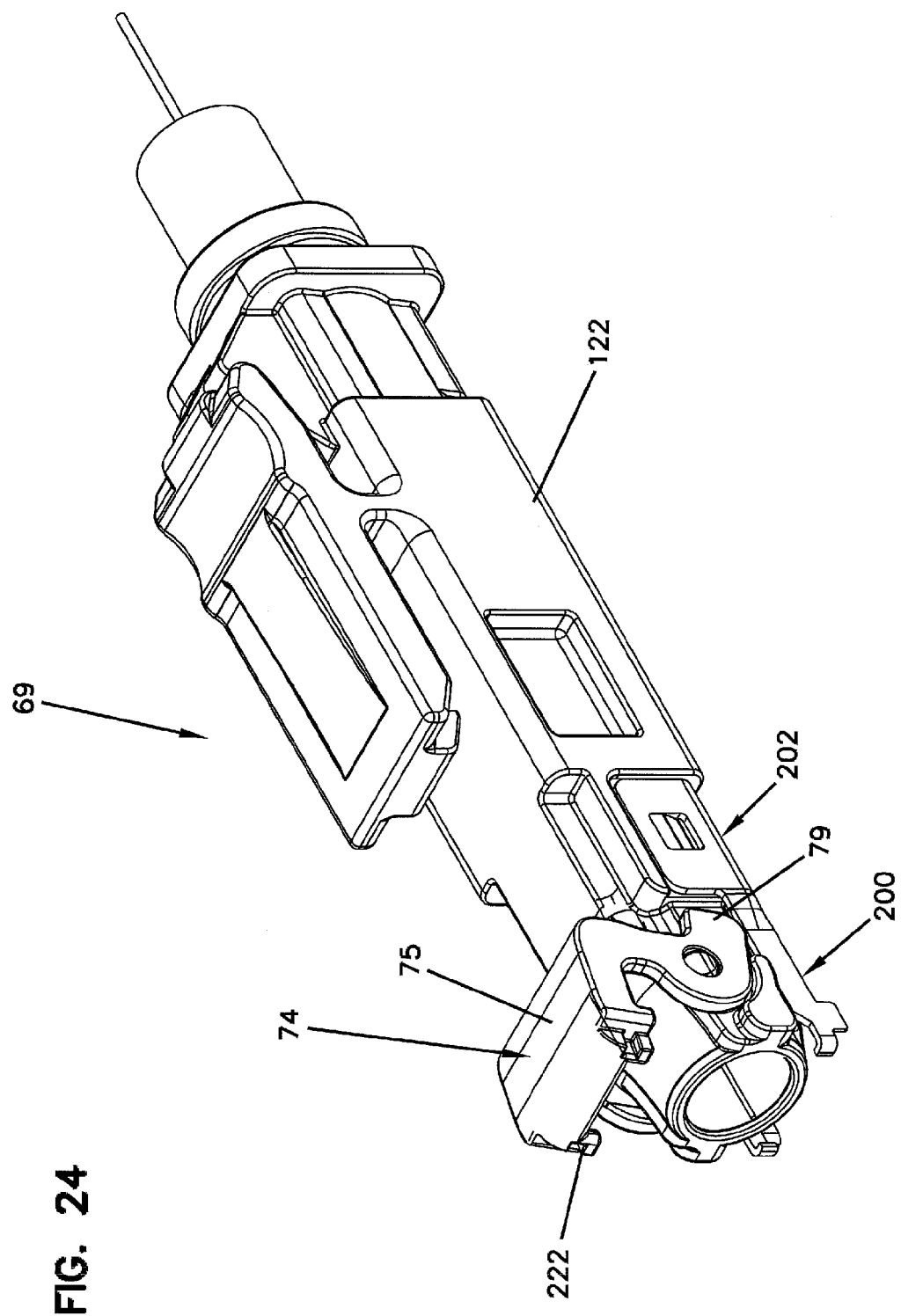
FIG. 24 is a front, top, perspective view of the fiber optic connector of FIG. 20 with a shutter of the fiber optic connector in an open position.
Figure 25:
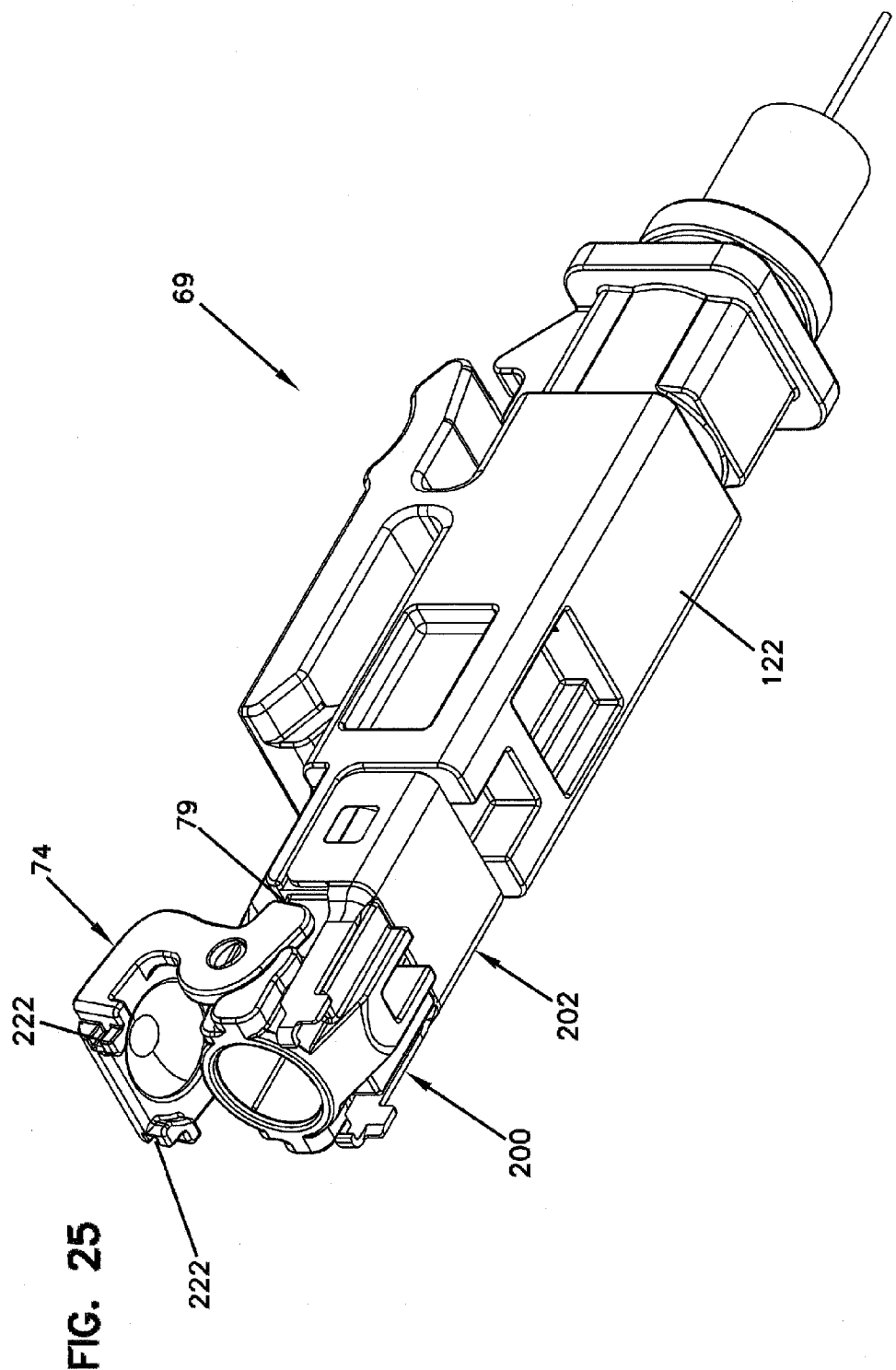
FIG. 25 is a front, bottom, perspective view of the fiber optic connector of FIG. 22 with the shutter in the open position.

The shutter 74 of the fiber optic connector 69 is movable between a closed position (see FIGS. 22 and 23) and an open position (see FIGS. 24 and 25). When the shutter 74 is in the closed position, the ferrule-less end portion 100' of the optical fibers 100 is protected from contamination. When the shutter 74 is in the open position, the ferrule-less end portion 100' is exposed and capable of being accessed for making an optical connection. The shutter 74 includes a front cover portion 75, a top portion 77 and a lever portion 79 that projects upwardly from the top portion 77. The shutter 74 pivots between the open and closed positions about a pivot axis 73.

Figure 26:
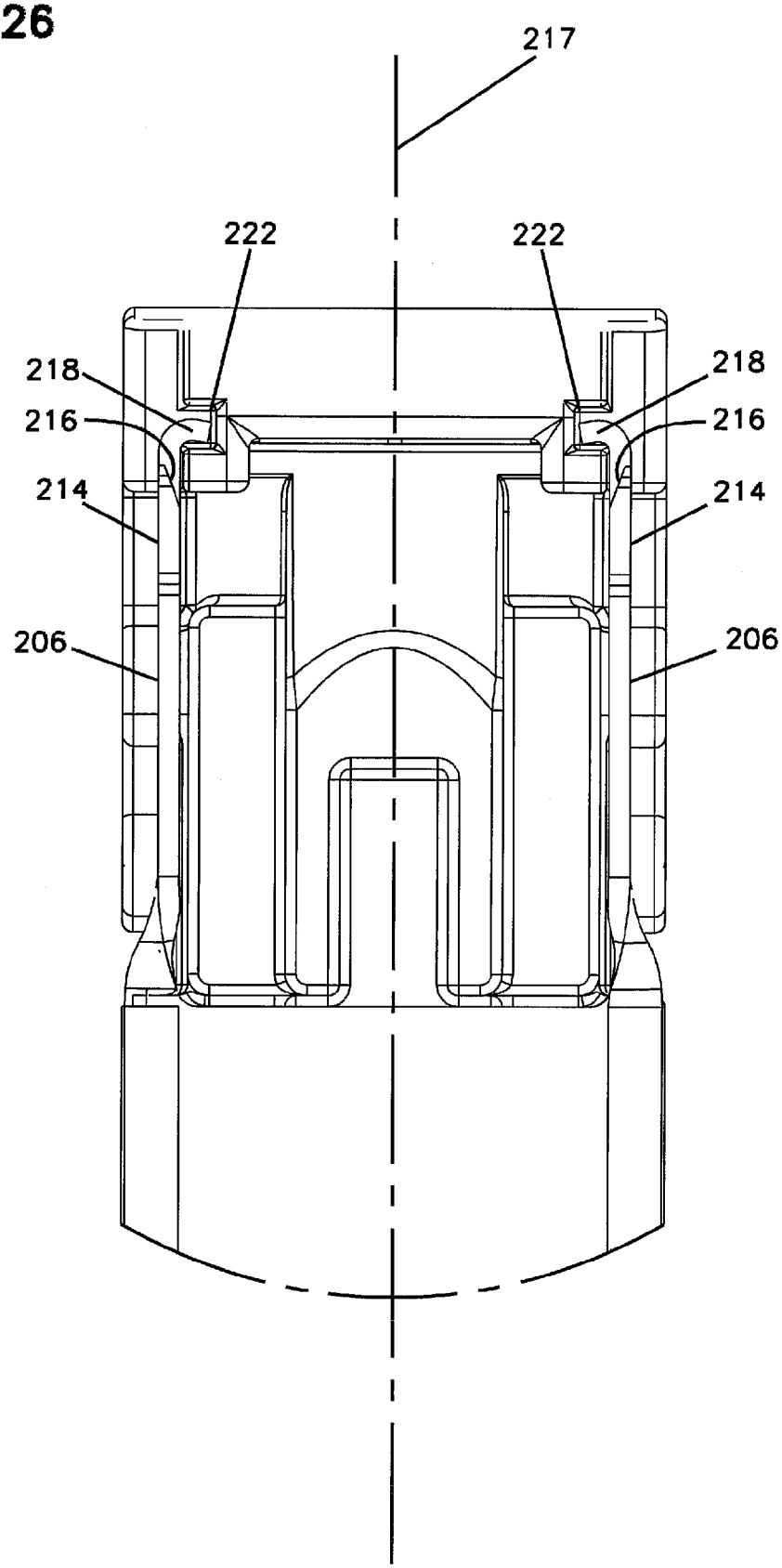
FIG. 26 is a bottom view of a front end of the fiber optic connector of FIG. 22 with a shutter latch mechanism in a latching position.
Figure 28:
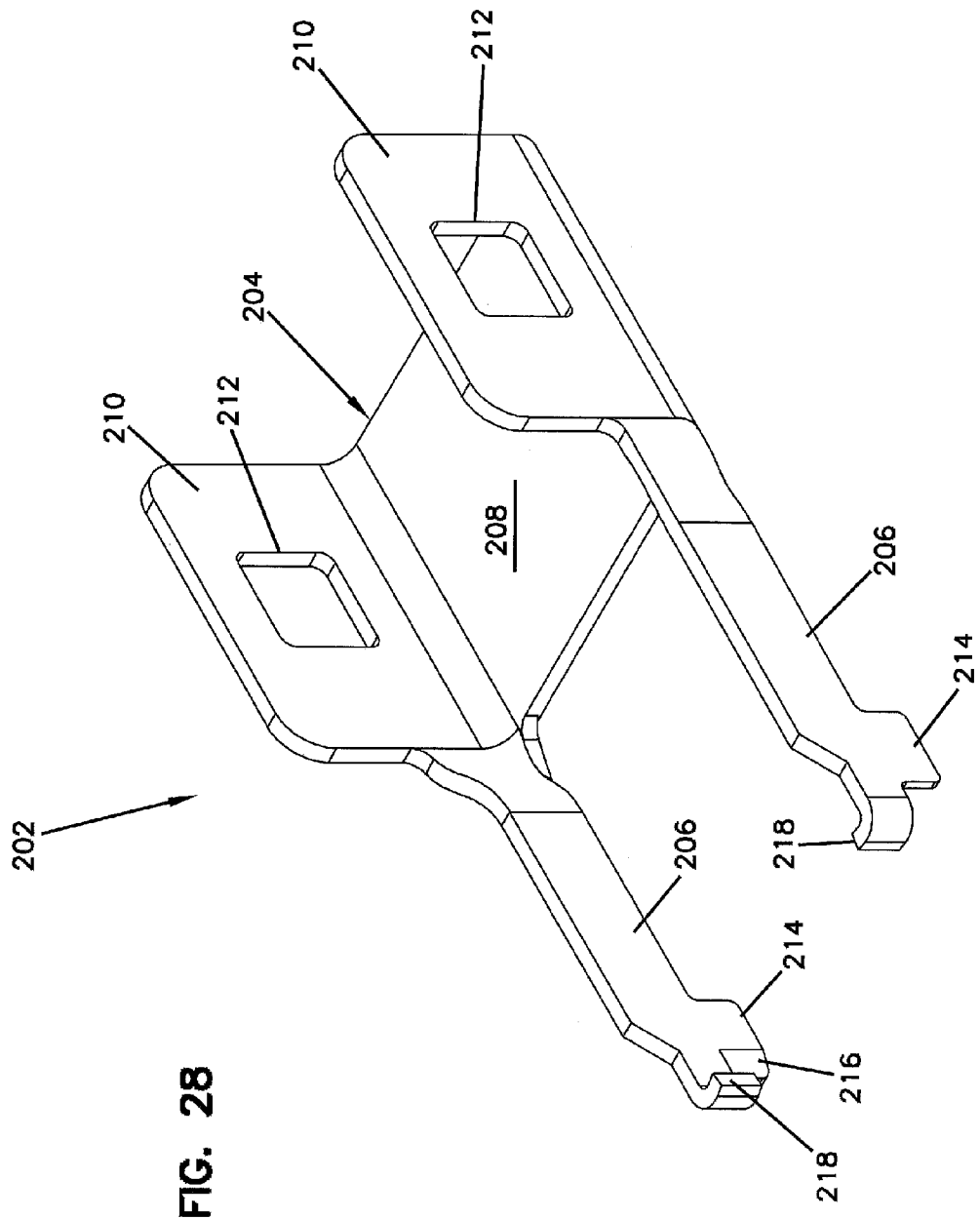
FIG. 28 is a perspective view of the shutter latch mechanism of the fiber optic connector of FIG. 22.

The fiber optic connector 69 includes a latching mechanism 200 that positively latches the shutter 74 in the closed position. The latching mechanism 200 can include a latching clip 202 that engages the shutter 74 to retain the shutter 74 in the closed position. As shown at FIG. 28, the latching clip 202 includes a main body 204 and two spaced-apart latching arms 206. The main body 204 includes a base 208 and two opposing side walls 210 that extend upwardly from the base 208. The side walls 210 define openings 212. The latching arms 206 have a resilient, cantilevered configuration and project forwardly from the base 208. The latching arms 206 include downwardly projecting release tabs 214 having ramp surfaces 216. The latching arms 206 also include end hooks 218. The ramp surfaces 216 face generally towards each other (i.e., the ramp surfaces face toward a vertical reference plane 217 (see FIG. 26) that longitudinally bisects the connector body 122) and are angled to extend laterally outwardly as the ramp surfaces 216 extend in the connector insertion direction.

Figure 27:
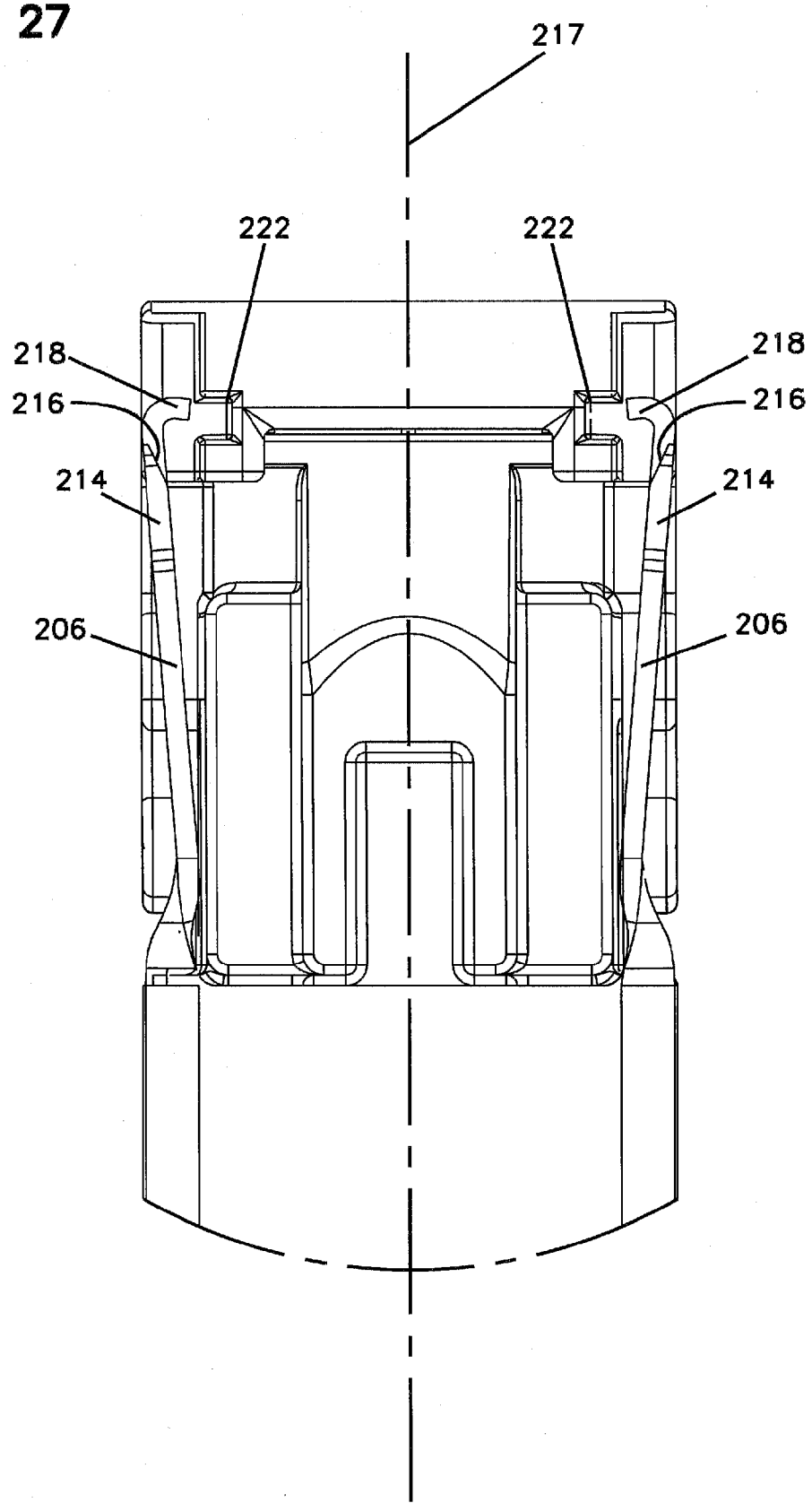
FIG. 27 is a bottom view of a front end of the fiber optic connector of FIG. 22 with the shutter latch mechanism in a release position.

The latching clip 202 is installed on the connector 69 by snapping the main body 204 onto the connector body 122. When the main body 204 is snapped in position, the side walls 210 straddle the sides of the connector body 122 and the base 208 is positioned beneath the underside of the connector body 122. The side walls 210 can flex to allow side tabs 220 of the connector body 122 to snap-fit into the openings 212 of the side walls 210. With the latching clip 202 is installed on the connector body 122, the latching arms 206 extend along opposite sides of the connector body 122 adjacent the bottom of the connector body 122. The release tabs 214 project downwardly below the bottom side of the connector body 122. The latching arms 206 are movable between a latching position (see FIG. 26) and a release position (see FIG. 27). When the latching arms 206 are in the latching position and the shutter 74 is in the closed position, the end hooks 218 of the latching arms 206 fit within receptacles 222 defined by the shutter 74 such that the latching arms 206 retain the shutter 74 in the closed position. Thus, the latching arms 206 prevent the shutter 74 from moving from the closed position to the open position. When the latching arms 206 are in the release position, the latching arms 206 are flexed laterally outwardly such that the end hooks 218 are outwardly displaced from the receptacles 222. In this way, the latching arms 206 do not interfere with movement of the shutter 74 and the shutter 74 is free to be moved from the closed position to the open position.

Figure 29:
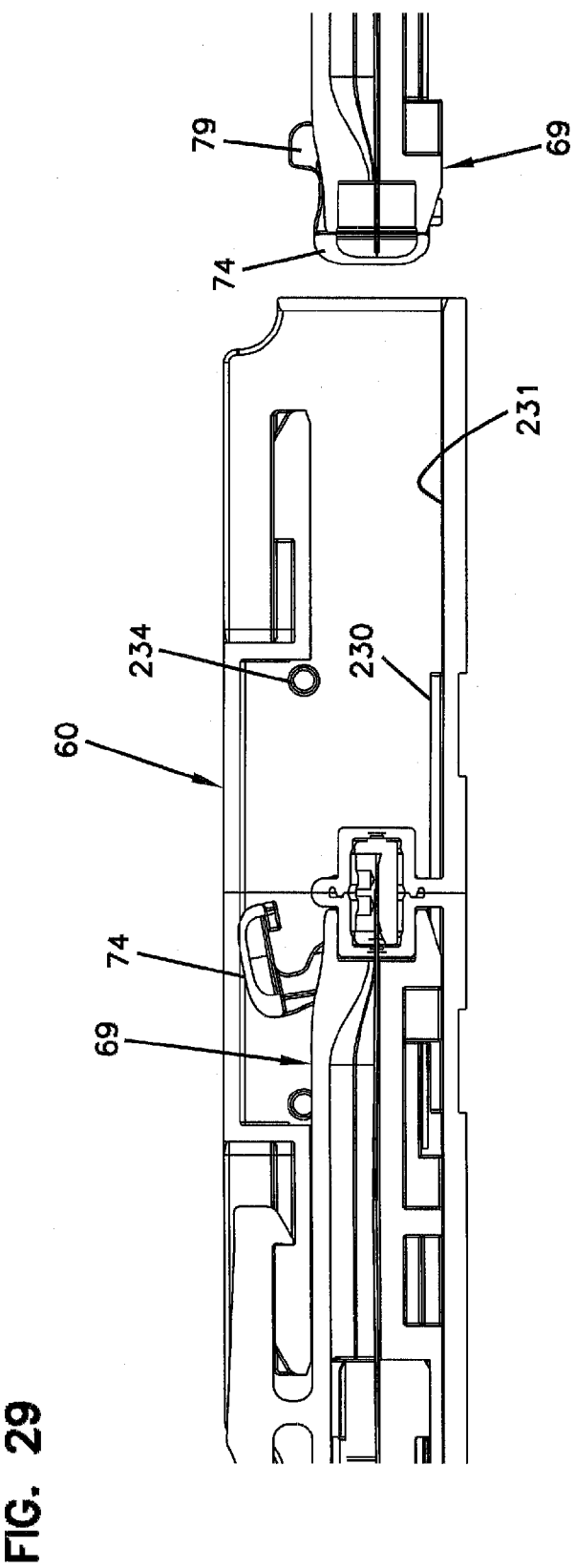
FIG. 29 shows the fiber optic adapter of FIG. 16 with a first fiber optic connector loaded in the left port and second fiber optic connector aligned with the right port.
Figure 35:
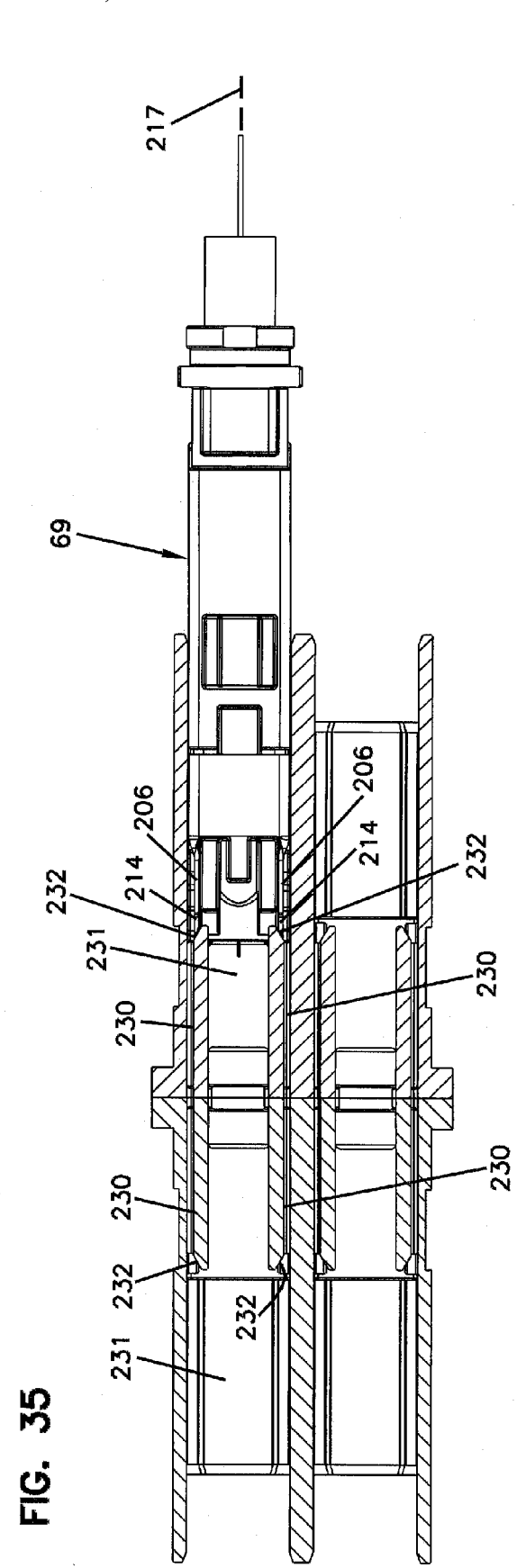
FIG. 35 is a cross-sectional view of the fiber optic adapter of FIG. 29 with the second fiber optic connector inserted into the right port of the fiber optic adapter to a point where the shutter latch mechanism of the second fiber optic connector is initially engaging release rails of the fiber optic adapter and the shutter latch mechanism still in the latching position of FIG. 26.
Figure 36:
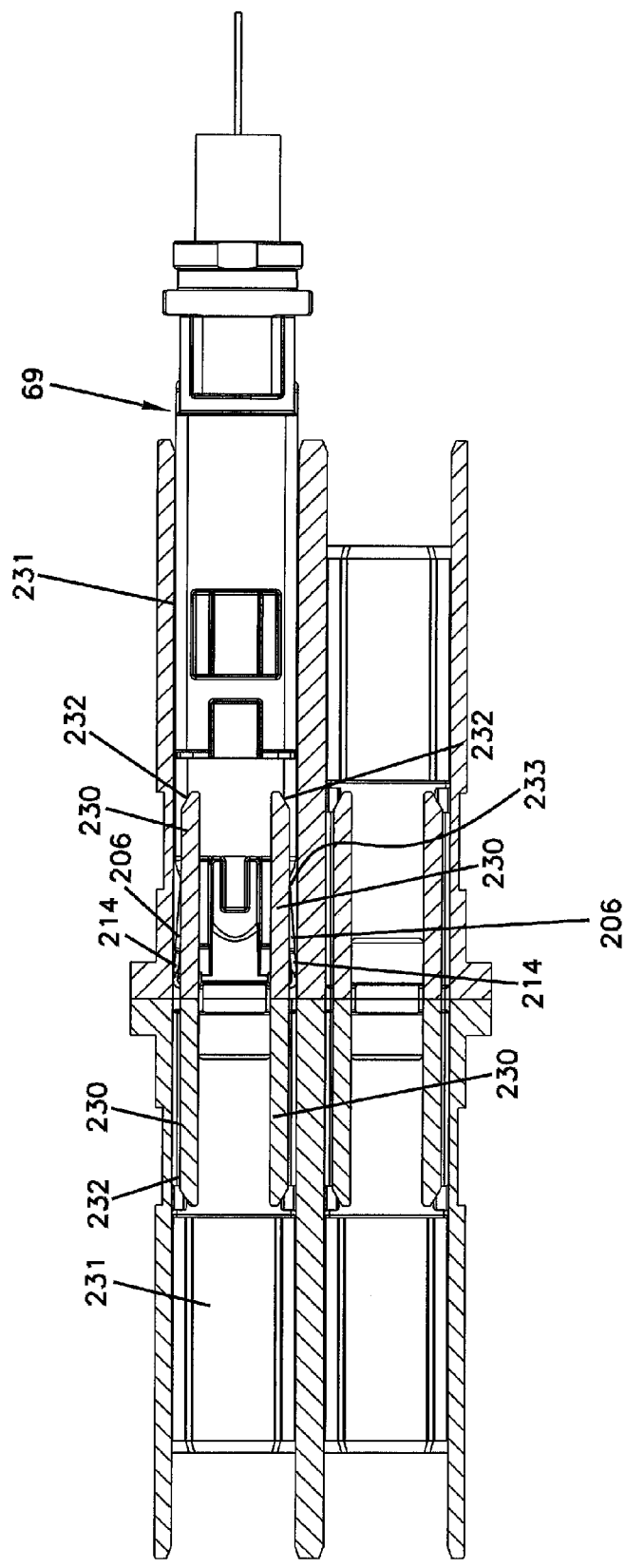
FIG. 36 is a cross-sectional view of the fiber optic adapter of FIG. 29 with the second fiber optic connector inserted into the right port of the fiber optic adapter to a point where the shutter latch mechanism of the second fiber optic connector is engaging release rails of the fiber optic adapter and the release rails are holding the shutter latch mechanism in the release position of FIG. 27.

Fiber optic adapters in accordance with the principles of the present disclosure can include structure for consecutively moving the latching arms 206 from the latching position to the release position and then moving the shutter 74 from the closed position to the open position as the connector 69 is inserted into the fiber optic adapter. The structure can also move the shutter 74 from the open position to the closed position and then allow the latching arms to move from the release position to the latching position as the connector 69 is withdrawn from the adapter. As shown at FIGS. 29, 35 and 36, the fiber optic adapter 60 includes a pair of release rails 230 corresponding to each adapter port 231. The release rails 230 are parallel and have ramp surfaces 232 at their outer ends. The release rails 230 are parallel to the direction of insertion of the connector 69 within the adapter port 231 and the ramp surfaces 232 angle laterally outwardly as the ramp surfaces 232 extend in the connector insertion direction. The ramp surfaces 232 face generally away from one another and away from the central vertical reference plane 217 that longitudinally bisects the connector body 122. The fiber optic adapter 60 also includes shutter actuation posts 234 corresponding to the adapter ports 231. The release rails 230 are positioned adjacent bottom sides of the adapter ports 231 and the actuation posts 234 are positioned adjacent top sides of the adapter ports 231.

When one of the connectors 69 is inserted into one of the adapter ports 231, the ramp surfaces 216 of the latching arms 206 approach the ramp surfaces 232 of the release rails 230 (see FIG. 35). Continued insertion of the connector 69 into the adapter port 231 brings the ramp surfaces 216, 232 into contact with one another and the ramp surfaces 216 ride over the ramp surfaces 232. As the ramp surfaces 216 ride over the ramp surface 232, the latching arms 206 are forced to flex laterally outwardly from the latching position of FIG. 26 to the release position of FIG. 27. Once the ramp surfaces 216 move past the ramp surfaces 232, the release tabs 214 ride on outer sides 233 of the release rails 230 as the connector is continued to be inserted into the adapter port 231. Thus, once the connector is inserted so that the ramp surfaces 216 of the latching arms 206 have moved past the ramp surfaces 232 of the release rails 230, the outer sides 233 of the release rails 230 function to retain/hold the latching arms 206 in the release position through continued engagement with the release tabs 214.

The shutter actuation posts 234, the ramp surfaces 232 of the rails 230, the ramp surfaces 216 of the latching arms 206 and the lever portions 79 of the shutters 74 are all relatively positioned such that, during connector insertion, the lever portion 79 of the shutter 74 contacts the shutter actuation post 234 after the ramp surfaces 216 of the latching arms 206 have ridden over the ramp surfaces 232 of the release rails 230. Thus, the relative positioning ensures that the latching arms 206 have been moved to the release position prior to the lever portion 79 of the shutter 74 engaging the shutter actuation post 234. Contact between the shutter actuation post 234 and the lever portion 79 of the shutter 74 as the connector 69 is inserted into the adapter port 64 causes the shutter 74 to pivot about the pivot axis 73 from the closed position to the open position. Since the latching arms 206 had previously been moved to the release position as described above, the latching arms 206 do not interfere with movement of the shutter 74.

Figure 30:
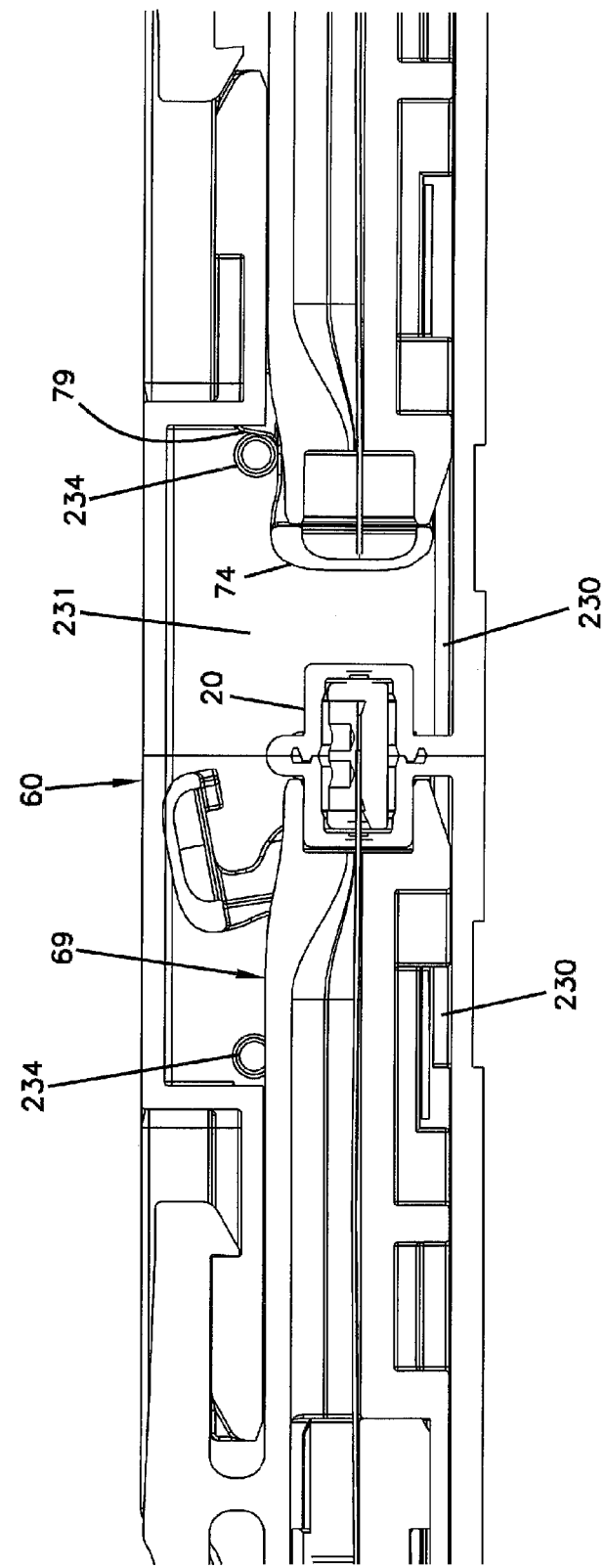
FIG. 30 shows the fiber optic adapter of FIG. 29 with the second fiber optic connector inserted to a position where the shutter latch mechanism has been moved to a release position.
Figure 31:
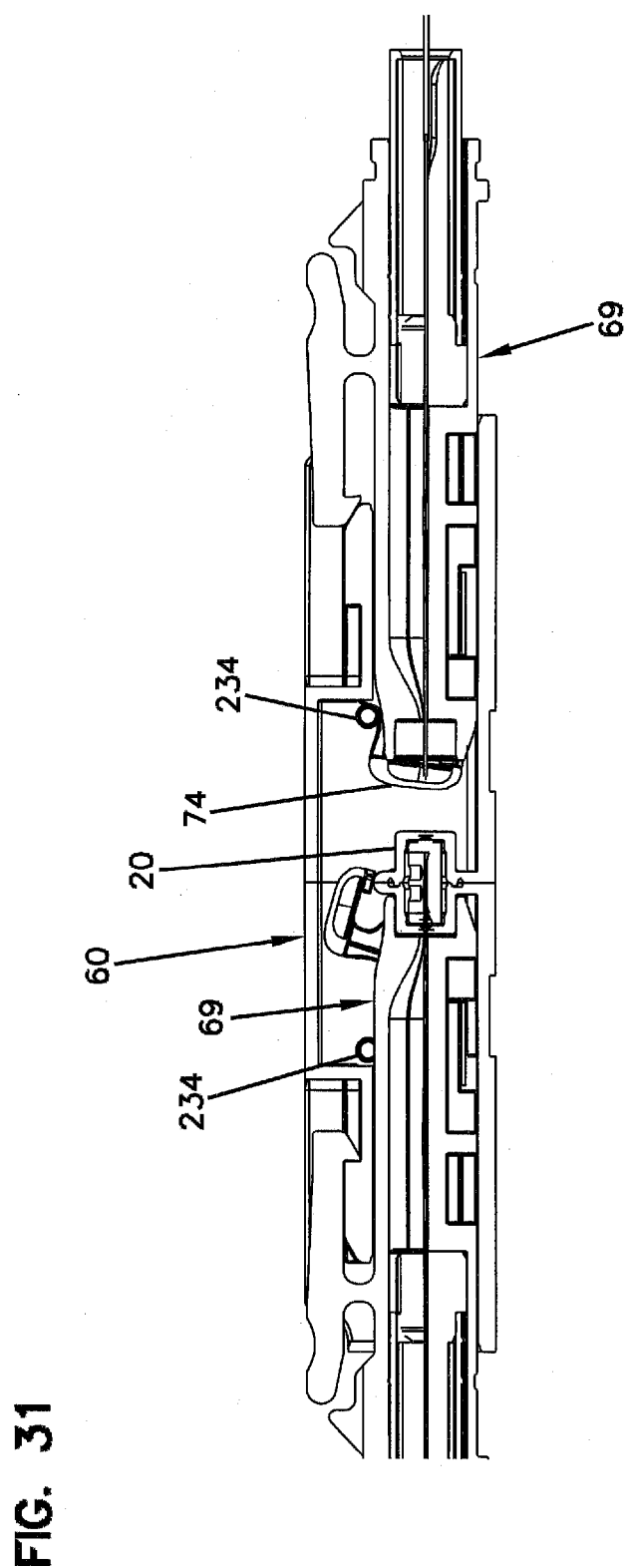
FIG. 31 shows the fiber optic adapter of FIG. 30 with the second fiber optic connector inserted to a position where the shutter has pivoted partially from the closed position toward the open position through contact with a shutter actuation post within the right port of the fiber optic adapter.
Figure 32:
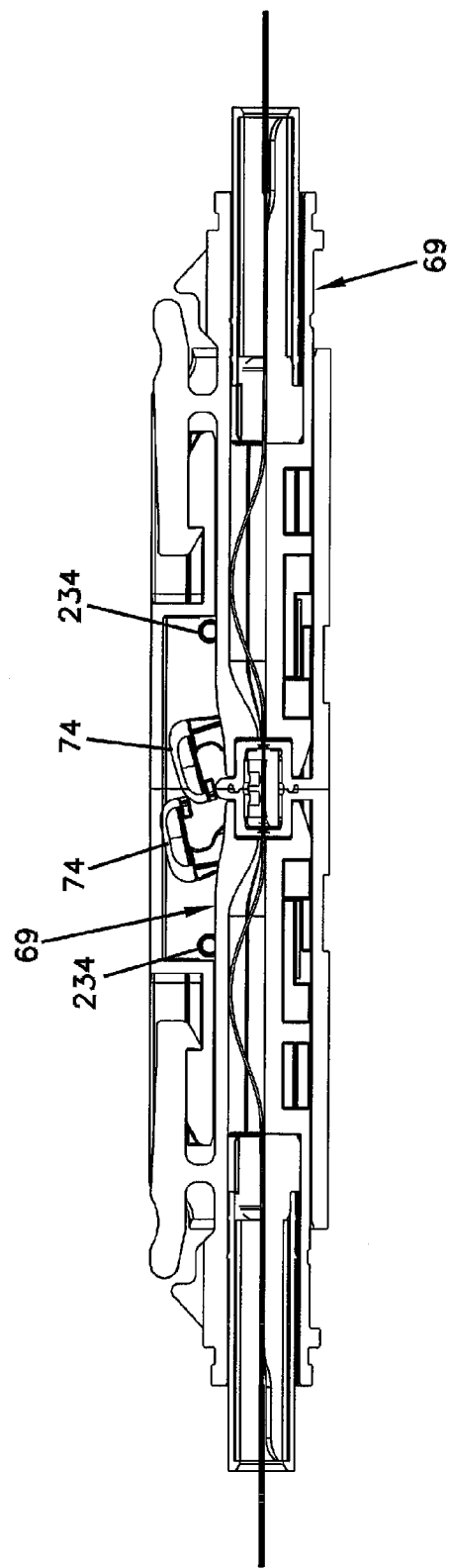
FIG. 32 shows the fiber optic adapter of FIG. 31 with the first and second fiber optic connectors fully loaded and secured in the fiber optic adapter and with optical fibers of the first and second fiber optic connectors co-axially aligned by an alignment device within the fiber optic adapter.

FIG. 29 shows the fiber optic adapter 60 with a left connector 69 already loaded in the left adapter port 231 and a right connector 69 ready to be inserted into the right connector port 231. FIG. 30 shows the fiber optic adapter 60 of FIG. 29 with the right connector 69 inserted to a position with the right adapter port 231 where the ramp surfaces 216 of the latching arms 206 are engaging the ramp surfaces 232 of the release rails 230 such that the latching arms 206 have moved from the latching position to the release position. FIG. 31 shows the fiber optic adapter 60 of FIG. 29 with the right connector 69 inserted to a position within the right adapter port 231 where the latching arms 206 are in the released position and the lever portion 79 of the shutter 74 is contacting the shutter actuation post 234 thereby causing the shutter 74 to pivot from the closed position toward the open position as the connector 69 is inserted further into the adapter port 231. FIG. 32 shows the fiber optic adapter 60 of FIG. 29 with the shutter in the open position and the connector fully inserted into the fiber optic adapter 60 such that the ferrule-less end portions 100' of the left and right connectors 69 are abutting one another and are being held in co-axial alignment by the alignment device 20.

Figure 33:
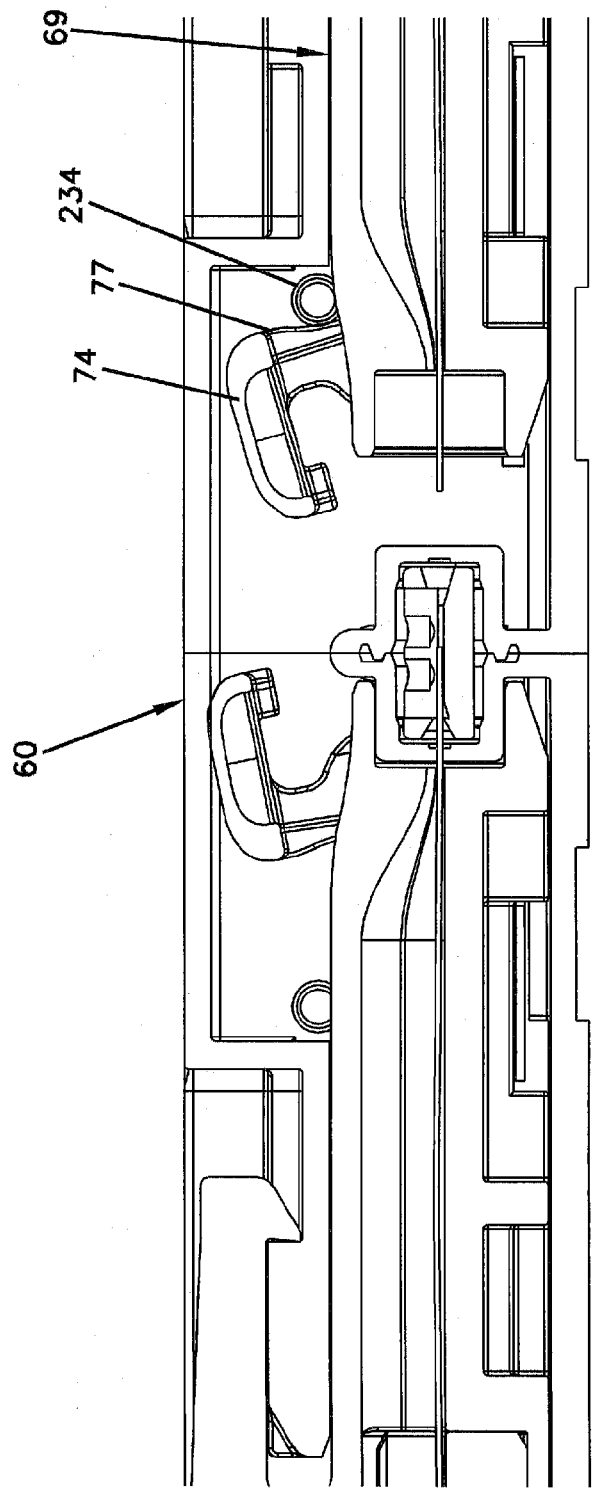
FIG. 33 shows the fiber optic adapter of FIG. 32 with the second fiber optic connector partially withdrawn from the right port of the fiber optic adapter and with the shutter of the second fiber optic connector contacting a shutter actuation post within the right port of the fiber optic adapter.
Figure 34:
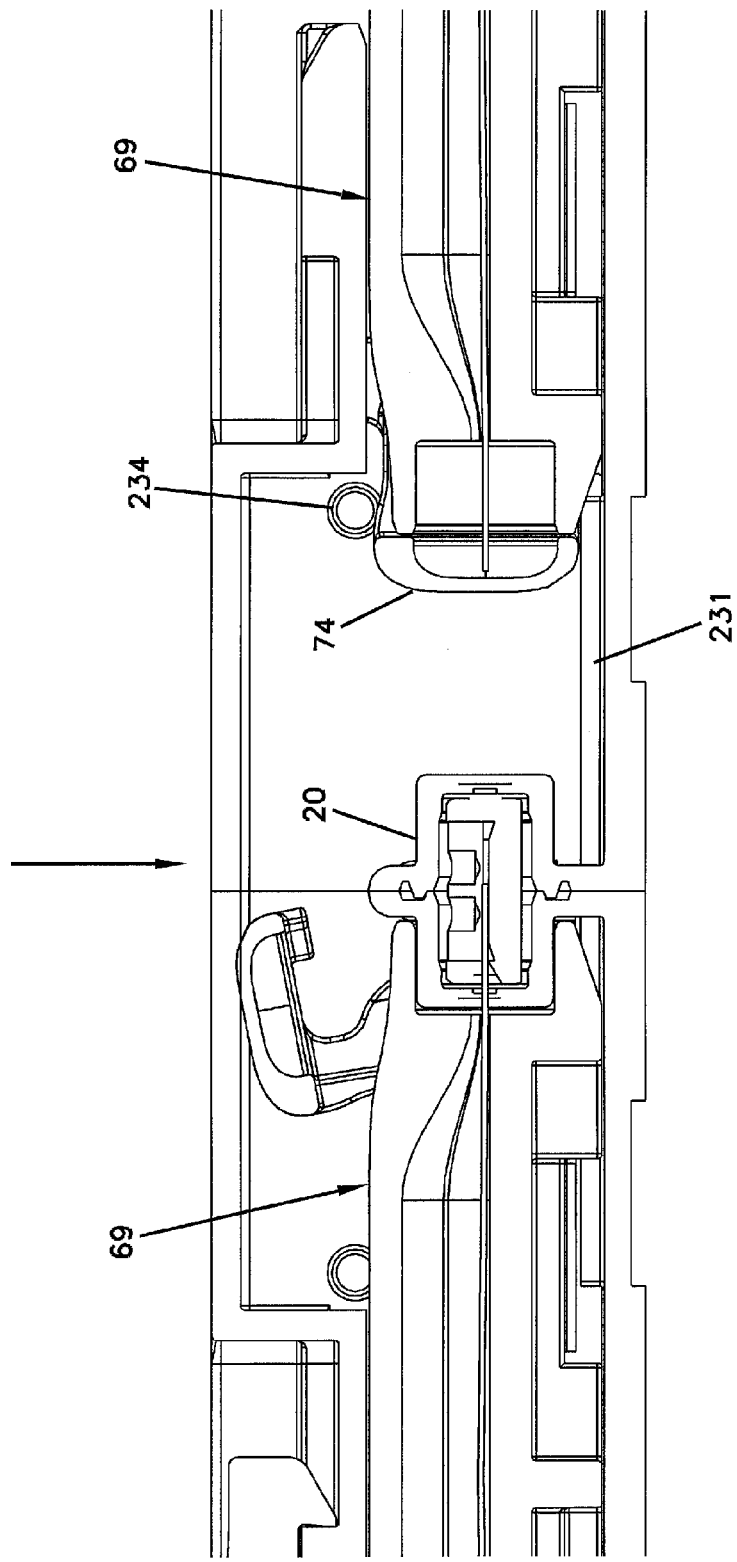
FIG. 34 shows the fiber optic adapter of FIG. 33 with the shutter pivoted to the closed position through contact with the shutter actuation post.

When the right connector 69 is withdrawn from the right adapter port 231 of the fiber optic adapter 60, the top portion 77 of the shutter 74 contacts the shutter actuation post 234 causing the shutter 74 to pivot from the open position to the closed position (see FIGS. 33 and 34). Thereafter, the ramp surfaces 216 of latching arms 206 slide back past the ramp surfaces 232 of the release rails 230. When this occurs, the inherent resiliency/elasticity of the latching arms 206 causes the latching arms to move from the release position back to the latching position. Thus, the latching arms 206 are spring biased toward the latching position. As the latching arms 206 move to the latching position, the end hooks 216 fit within the receptacles 222 of the closed shutter 74 thereby latching the shutter 74 in the closed position. Thus, the shutter 74 is latched in the closed position prior to full withdrawal of the right connector 69 from the right port 231 of the fiber optic adapter 60.

Figure 37:
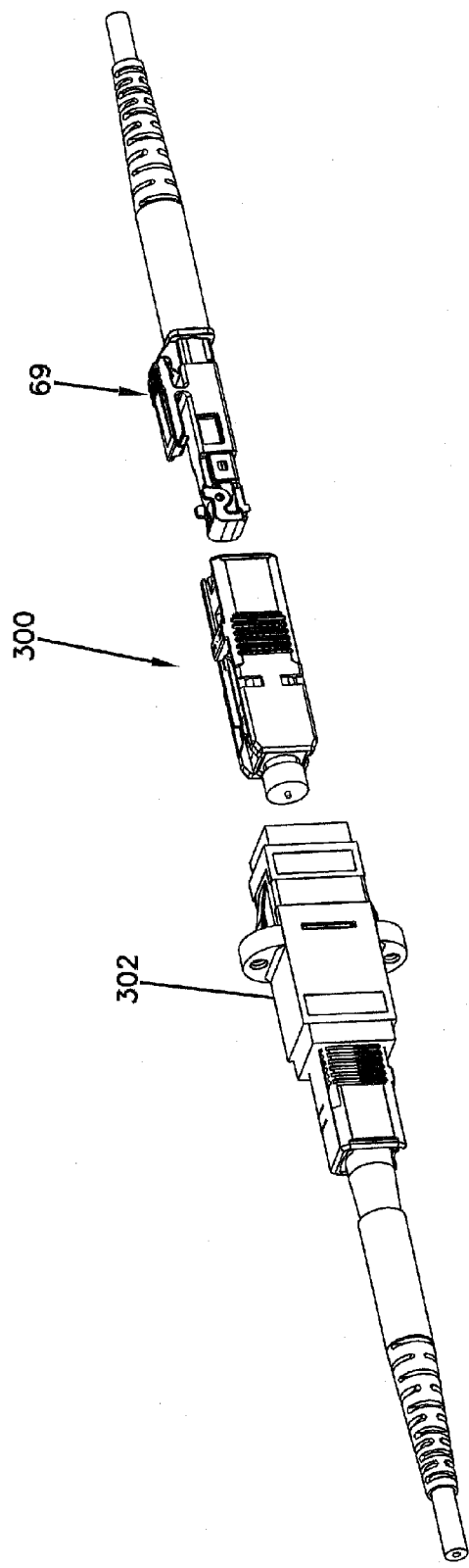
FIG. 37 is an exploded view showing a fiber optic adapter and a converter for converting the fiber optic connector of FIG. 20 to a ferruled fiber optic connector.
Figure 38:
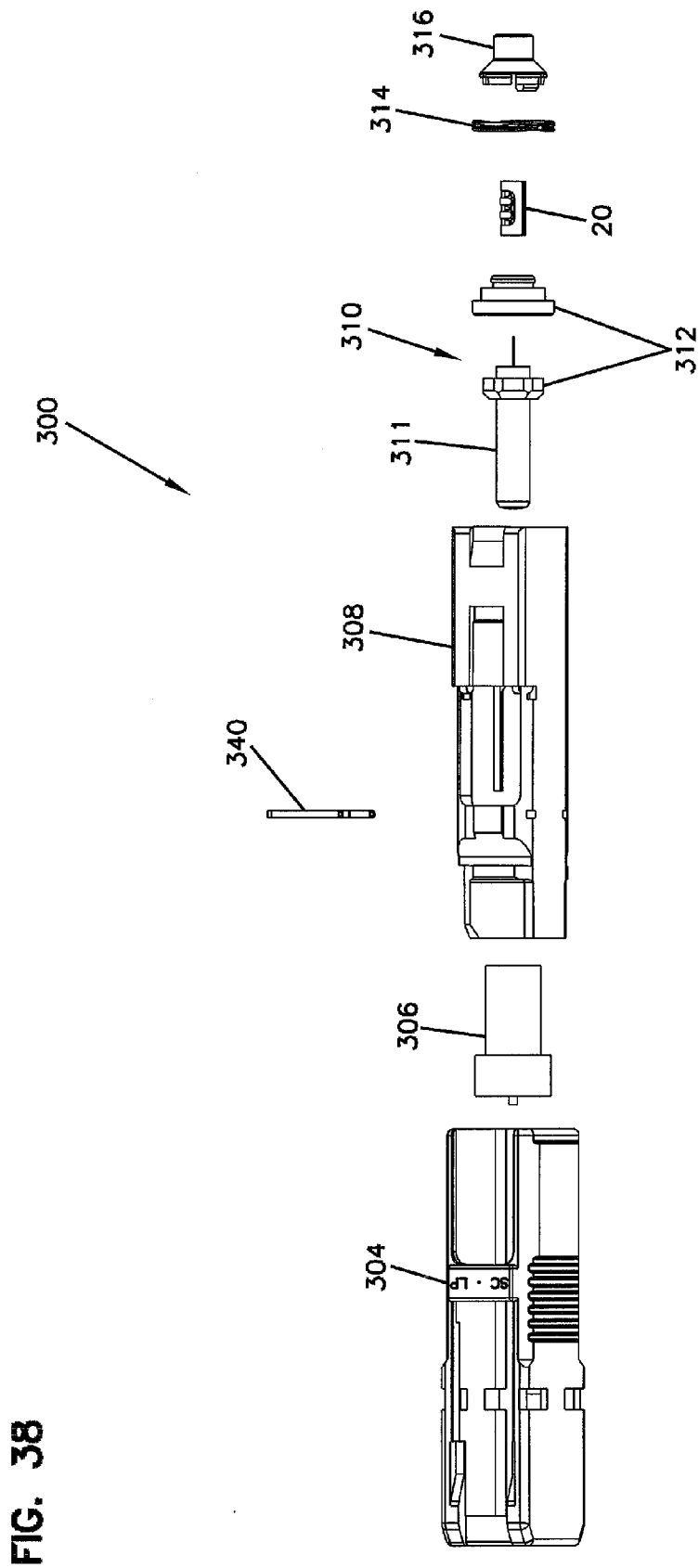
FIG. 38 is an exploded view of the converter of FIG. 37.
Figure 39:
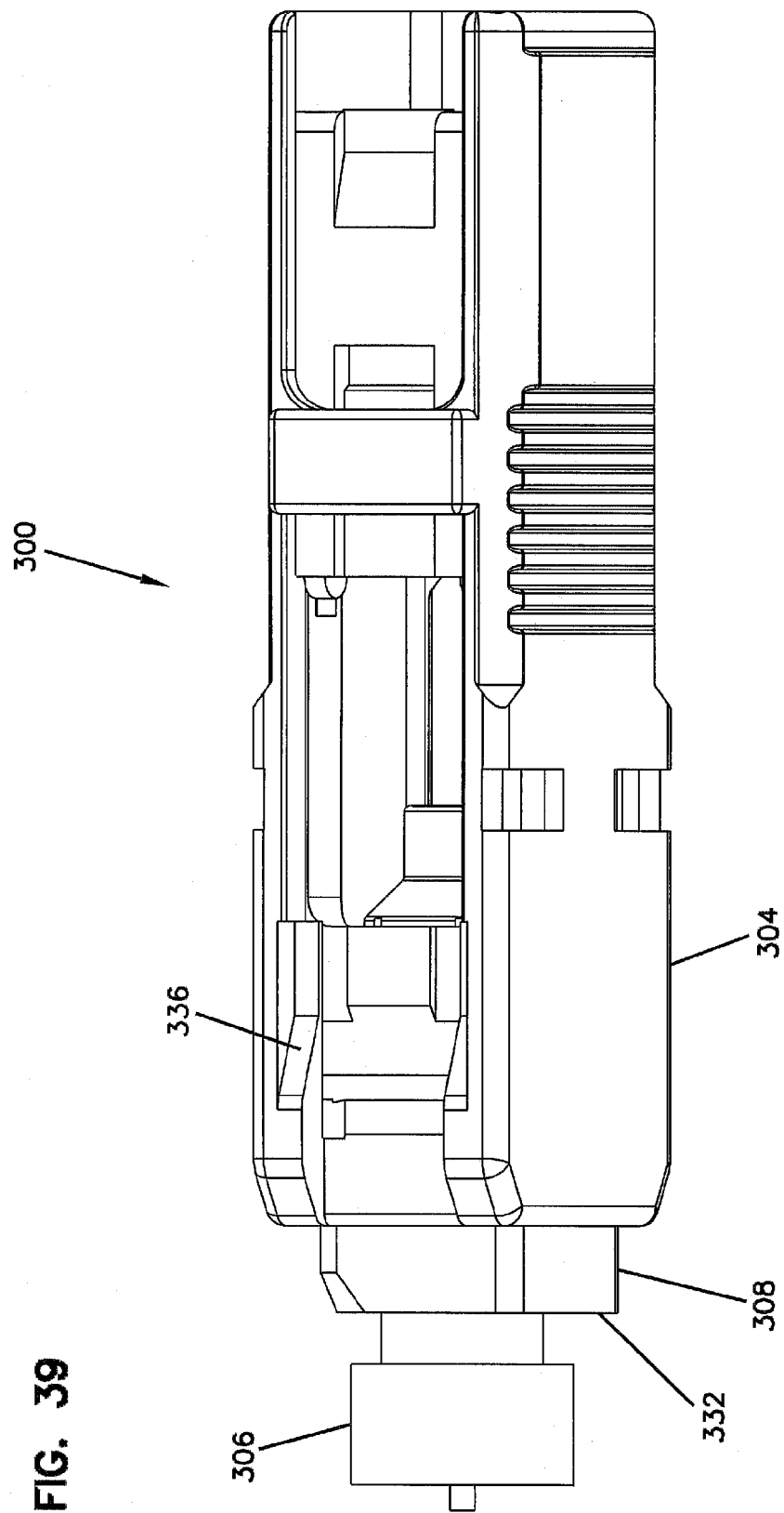
FIG. 39 is an assembled view of the converter of FIG. 38.
Figure 40:
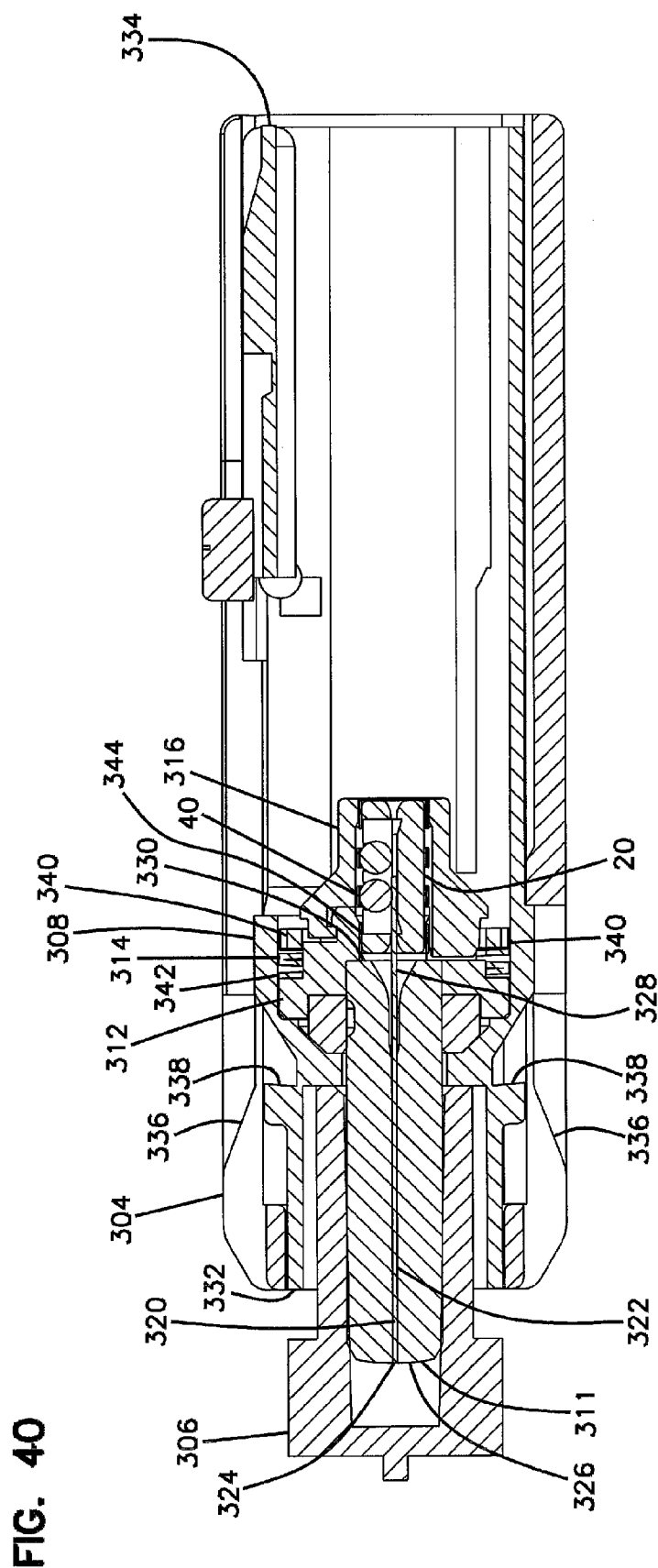
FIG. 40 is a cross-sectional view of the converter of FIG. 39.
Figure 41:
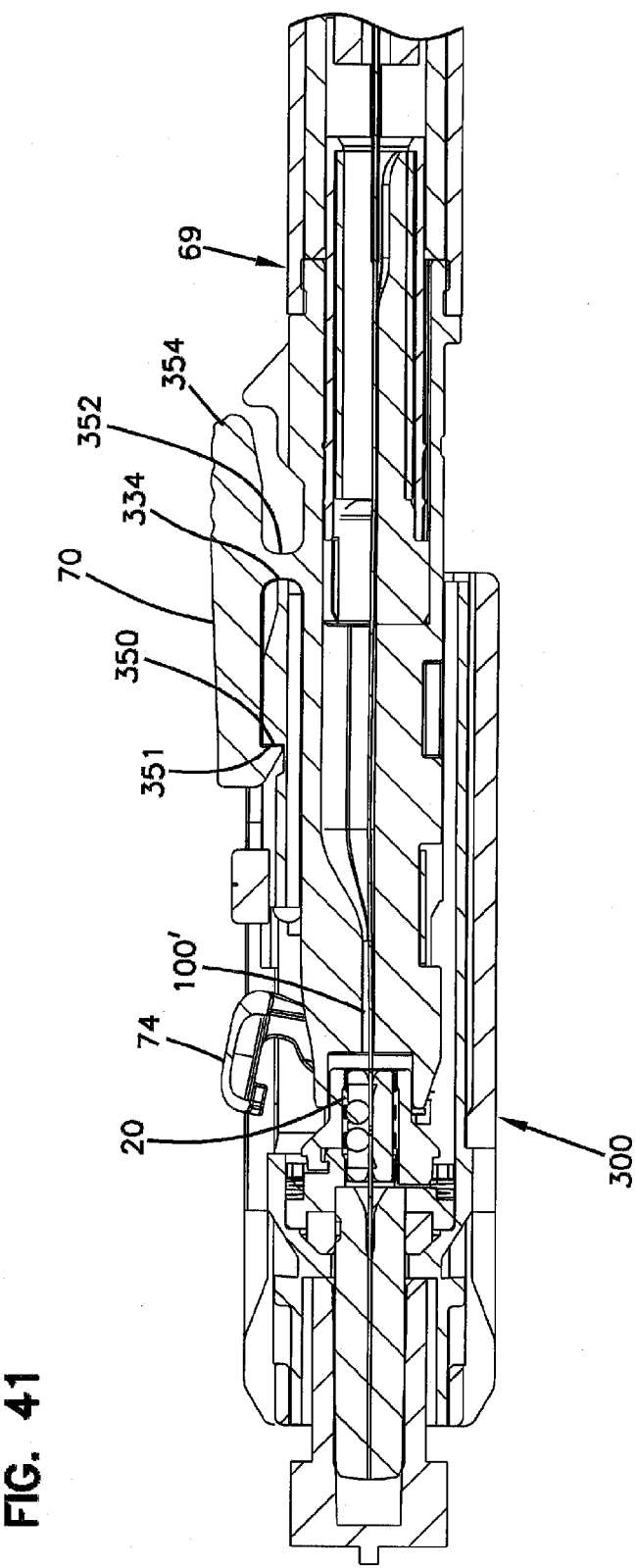
FIG. 41 is a cross-sectional view of the converter of FIG. 39 with the fiber optic connector of FIG. 20 inserted therein.

FIG. 37 shows a converter 300 in accordance with the principles of the present disclosure for converting the ferrule-less connector 69 to a ferruled connector. In the depicted embodiment, the ferruled connector has a SC-type footprint/shape/profile that mates with an SC-type fiber optic adapter 302 configured for interconnecting two ferruled SC-type connectors. As shown at FIGS. 38 and 39, the converter 300 includes an outer housing 304 (e.g., an SC-release sleeve that is pulled back to disengage the converter 300 from a standard SC adapter), a dust cap 306, an inner housing 308, a ferrule assembly 310 including a ferrule 311 and a ferrule hub 312 (i.e., a ferrule base) mounted to a back end of the ferrule 311, the fiber alignment device 20, a spring 314 for biasing the ferrule assembly 310 in a forward direction, and a retention cap 316 for securing the fiber alignment device 20 to the ferrule hub 312. As shown at FIG. 40, an optical fiber stub 320 is potted (e.g., adhesively secured) with a central bore 322 defined axially through the ferrule 311. The optical fiber stub 320 has a polished end 324 positioned adjacent a front end face 326 of the ferrule 311. The dust cap 306 can be mounted over the front end face 326 to protect the polished end 324 of the optical fiber stub 320 from damage or contamination. The optical fiber stub 320 includes a rear portion 328 that projects rearwardly from a rear end 330 of the ferrule 311. The rear portion 328 of the optical fiber stub 320 extends through the first funnel 36 of the optical fiber alignment device 20 and is shown pressed within the fiber alignment groove 32 by the first ball 40.

In certain embodiments, the spring 314 can be a spring washer such as a Belleville washer or a wave washer. In this way, the spring can provide its biasing function while being relatively compact in an axial direction.

Referring to FIGS. 39 and 40, the inner housing 308 includes a front end 332 and a rear end 334. The front end 332 forms a plug interface end compatible with a fiber optic adapter such as a standard SC adapter 302. The ferrule assembly 310 mounts with the inner housing 308 adjacent the front end 332 of the inner housing 308. The front end face 326 of the ferrule projects forwardly beyond the front end 332 of the inner housing 308 so as to be accessible for connection to another fiber optic connector. The outer housing 304 snaps over the inner housing 308 and has a limited range of axial movement relative to the inner housing 308. When front end 332 of the inner housing 308 is inserted into the fiber optic adapter 302, the ferrule 311 fits within an alignment sleeve of the fiber optic adapter 302 and latches of the adapter 302 engage upper and lower catches 338 of the inner housing 308 to lock the front end 332 of the inner housing 308 within the adapter 302. To release the inner housing 308 from the adapter 302, the outer housing 306 is retracted relative to the inner housing 308 such that upper and lower ramp surfaces 336 of the outer housing 306 disengage the latches of the adapter 302 from the catches 338 so that the inner housing 308 can be withdrawn from the adapter 302.

The ferrule assembly 310 and the spring 314 can be retained at the front end 332 of the inner housing 308 by a locking clip 340. The locking clip 340 can be side loaded into the inner housing 308 and captures the spring 314 and the ferrule hub 312 within the front end 332 of the inner housing 308. For example, the ferrule hub 312 and the spring 314 are captured between an inner shoulder 342 of the inner housing 308 and the locking clip 340. In this way, the spring biases the ferrule assembly 310 in a forward direction. During a connection, the ferrule assembly 310 can move rearwardly relative to the inner housing 308 against the bias of the spring 314 as the front end face 326 of the ferrule 311 contacts the end face of the ferrule of a mating connector inserted within the adapter 302. The locking clip 340 is preferably locked against axial movement relative to the inner housing 308. The hub assembly 310 has a range of axial movement relative to the inner housing 308 that is defined between the inner shoulder 342 and the locking clip 340. The alignment device 20 is mounted to the hub assembly 310. Thus, the alignment device 20 is carried with the hub assembly 310 as the hub assembly 310 moves axially relative to the inner housing 308. In one example, at least a portion of the alignment device fits inside a portion of the ferrule hub 312. For example, the ferrule hub 312 can define a receptacle 344 that receives one end of the alignment device 20. The retention cap 316 can snap-fit to a back end of the ferrule hub 312 and is configured to attach the alignment device 20 to the ferrule hub 312.

Figure 42:
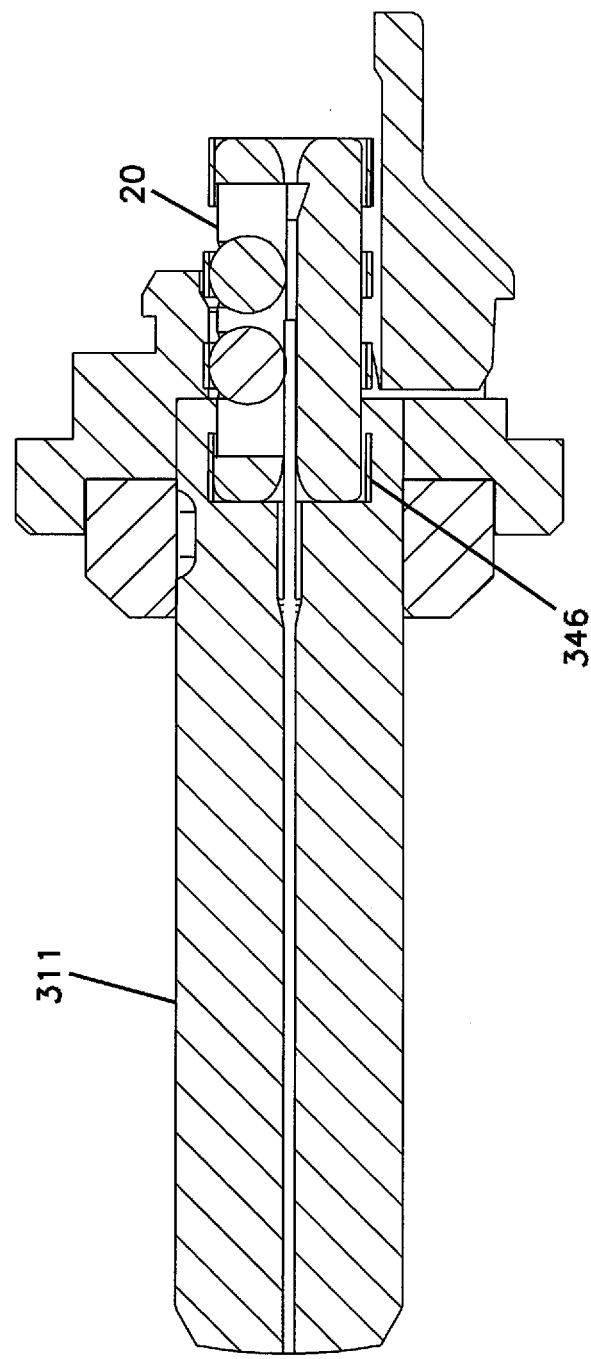
FIG. 42 shows an alternative mounting configuration for mounting a fiber alignment device to a ferrule assembly.
Figure 43:
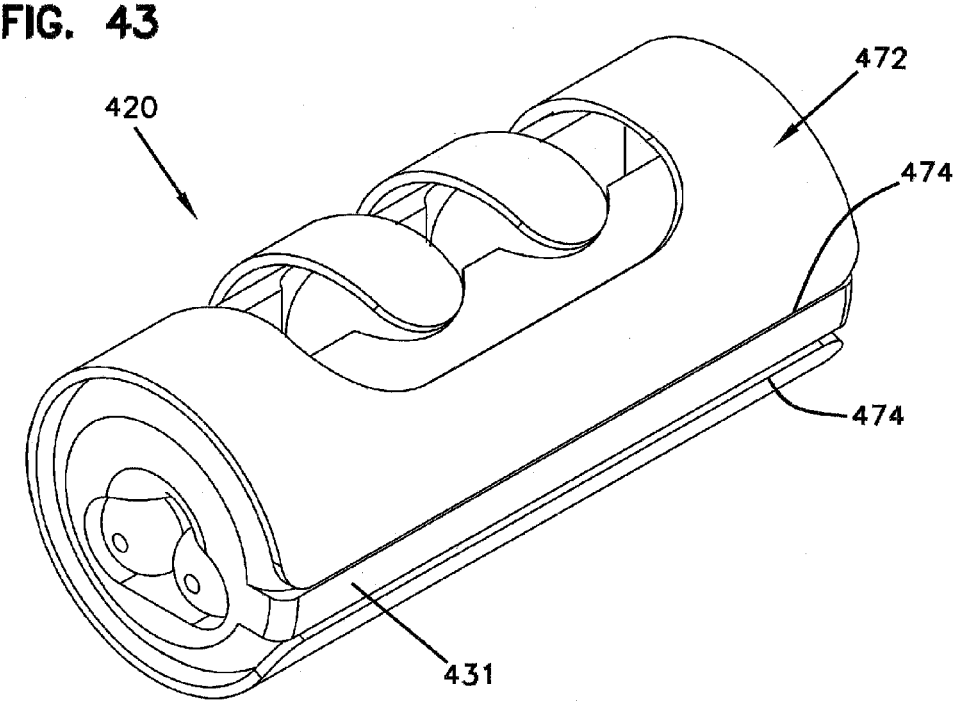
FIG. 43 is a perspective view of another optical fiber alignment device in accordance with the principles of the present disclosure.
Figure 44:
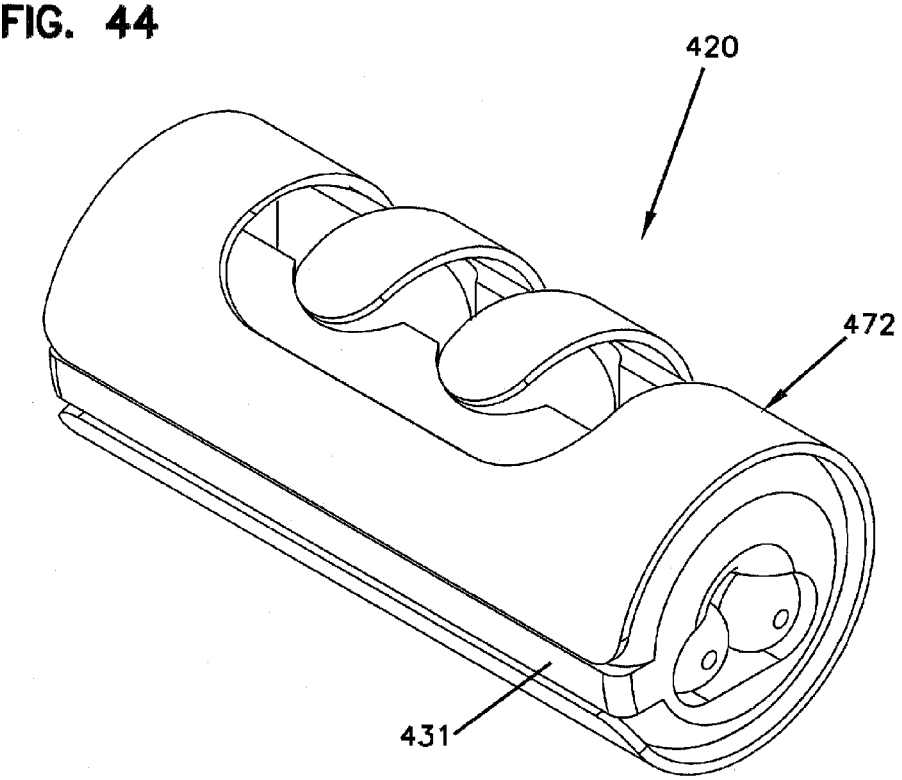
FIG. 44 is another perspective view of the optical fiber alignment device of FIG. 43.
Figure 45:
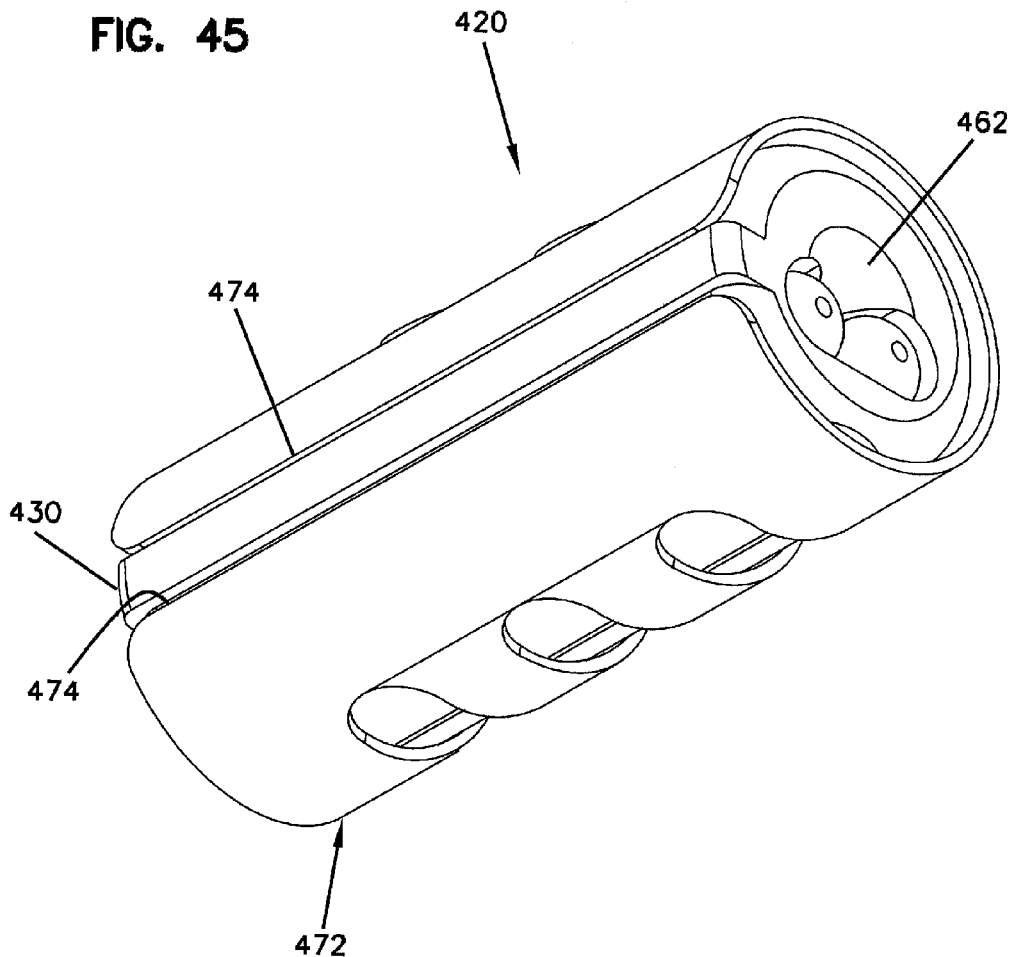
FIG. 45 is a further perspective view of the optical fiber alignment device of FIG. 43.
Figure 46:
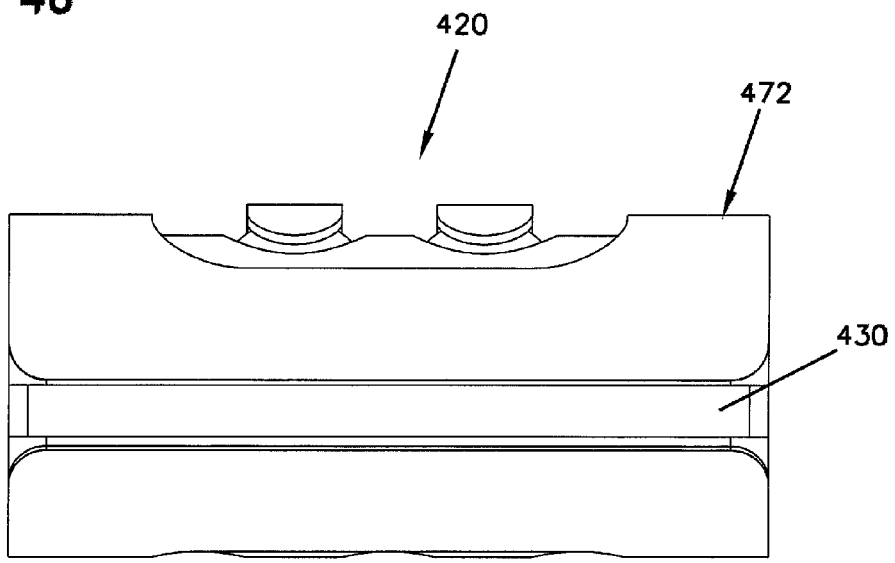
FIG. 46 is a side view of the optical fiber alignment device of FIG. 43.
Figure 47:
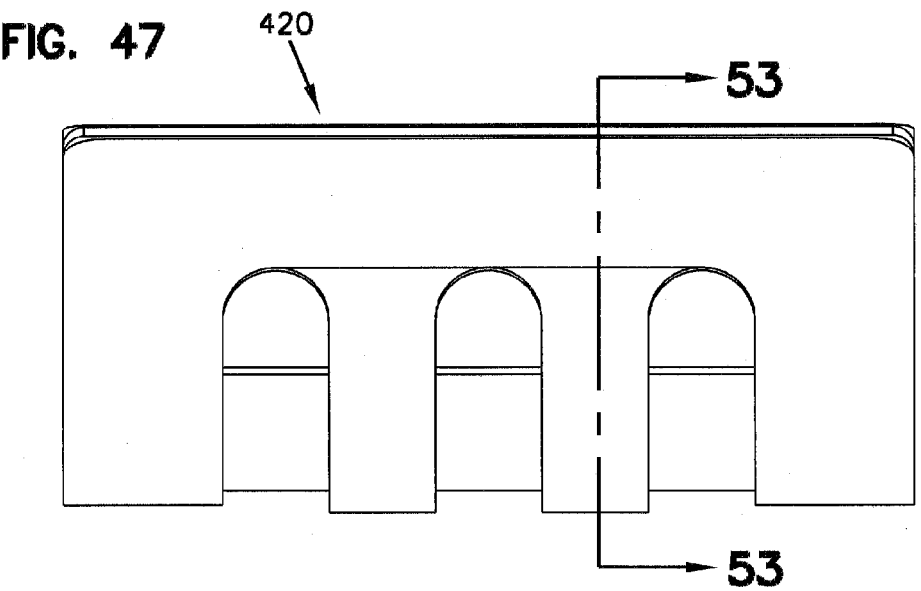
FIG. 47 is a top view of the optical fiber alignment device of FIG. 43.
Figure 48:
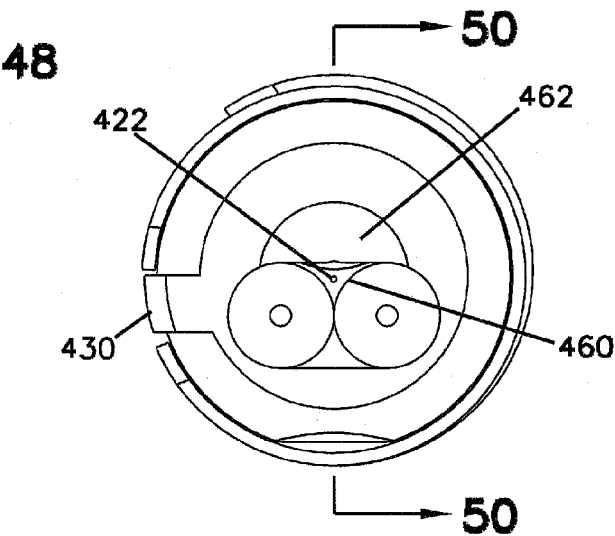
FIG. 48 is a first end view of the optical fiber alignment device of FIG. 43.
Figure 49:
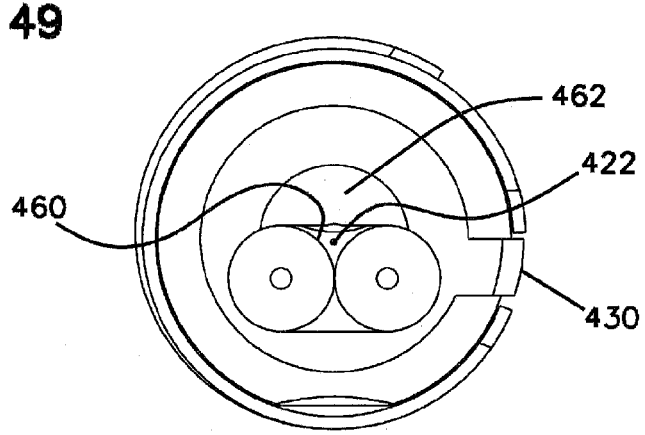
FIG. 49 is a second end view of the optical fiber alignment device of FIG. 43.
Figure 50:
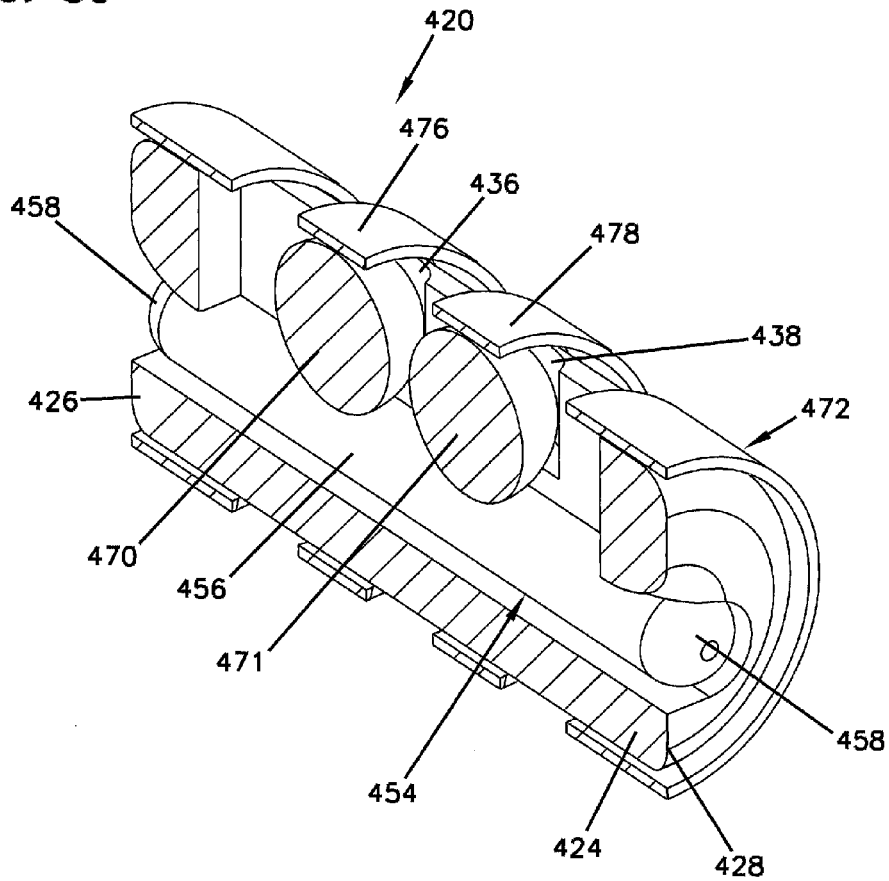
FIG. 50 is a longitudinal cross-sectional view of the optical fiber alignment device of FIG. 48 taken along section line 50-50.

By mounting the alignment device 20 within the ferrule hub 312, the assembly can be relatively short in length. This can be significant because limited space is available. In another example, the assembly can be further shortened by mounting at least a portion of the alignment device 20 within the ferrule 311. For example, FIG. 42 shows the ferrule 311 modified to include a rear receptacle 346 for receiving a portion of the alignment device 20 thereby shortening the overall length of the assembly.

In use, the connector 69 is inserted into the converter 300 through the rear end 334 of the inner housing 308. When inserted within the inner housing 308, the ferrule-less end portion 100' of the optical fiber 100 of the connector 69 slides inside the alignment device 20 and is co-axially aligned with and optically connected to the optical fiber stub 320 supported by the ferrule 311. The ferrule-less end portion 100' can extend through the second funnel 38 of the alignment structure 20 and can be pressed into the alignment groove 32 by the ball 41. The inner housing 308 can include structure for retaining the connector 69 within the rear end 334. For example, the inner housing 308 can include a catch 350 that engages the latch 70 of the connector 69. The latch 70 is connected to the main body 122 of the connector 69 by an interconnect piece 352. When the connector 69 is latched in the inner housing 308, the catch 350 opposes a latching surface 351 of the latch 70 and the rear end 334 opposes the interconnect piece 352 to limit axial movement between the connector 69 and the inner housing 308 in both inner and outer axial directions. By depressing a rear end 354 of the latch 70, the latching surface 351 can be disengaged from the catch 350 to permit removal of the connector 69. Contact between the rear end 334 of the inner housing 308 and the interconnect piece 352 limits the distance the connector 69 can be inserted into the inner housing 308. It will be appreciated that the inner housing 308 also includes structure for: a) moving the latching arms 206 of the connector 69 from the latching position to the release position; and b) moving the shutter 74 of the connector 69 from the closed position to the open position. For example, as disclosed with regard to the fiber optic adapter 60, the inner housing 308 can include the release rails 230 and the shutter actuation post 234.

Figure 51:
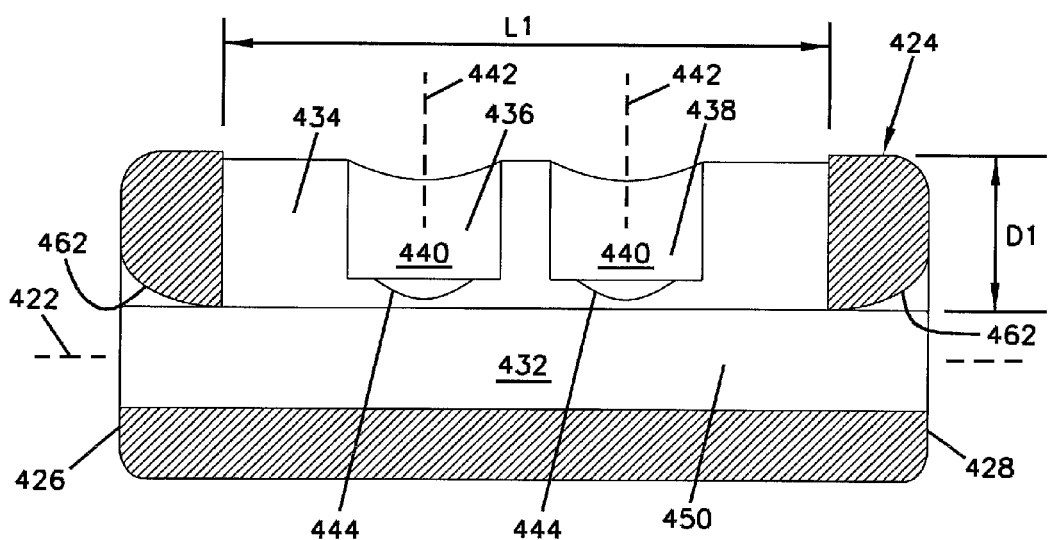
FIG. 51 is a longitudinal cross-sectional view of FIG. 50 with the internal components removed.
Figure 52:
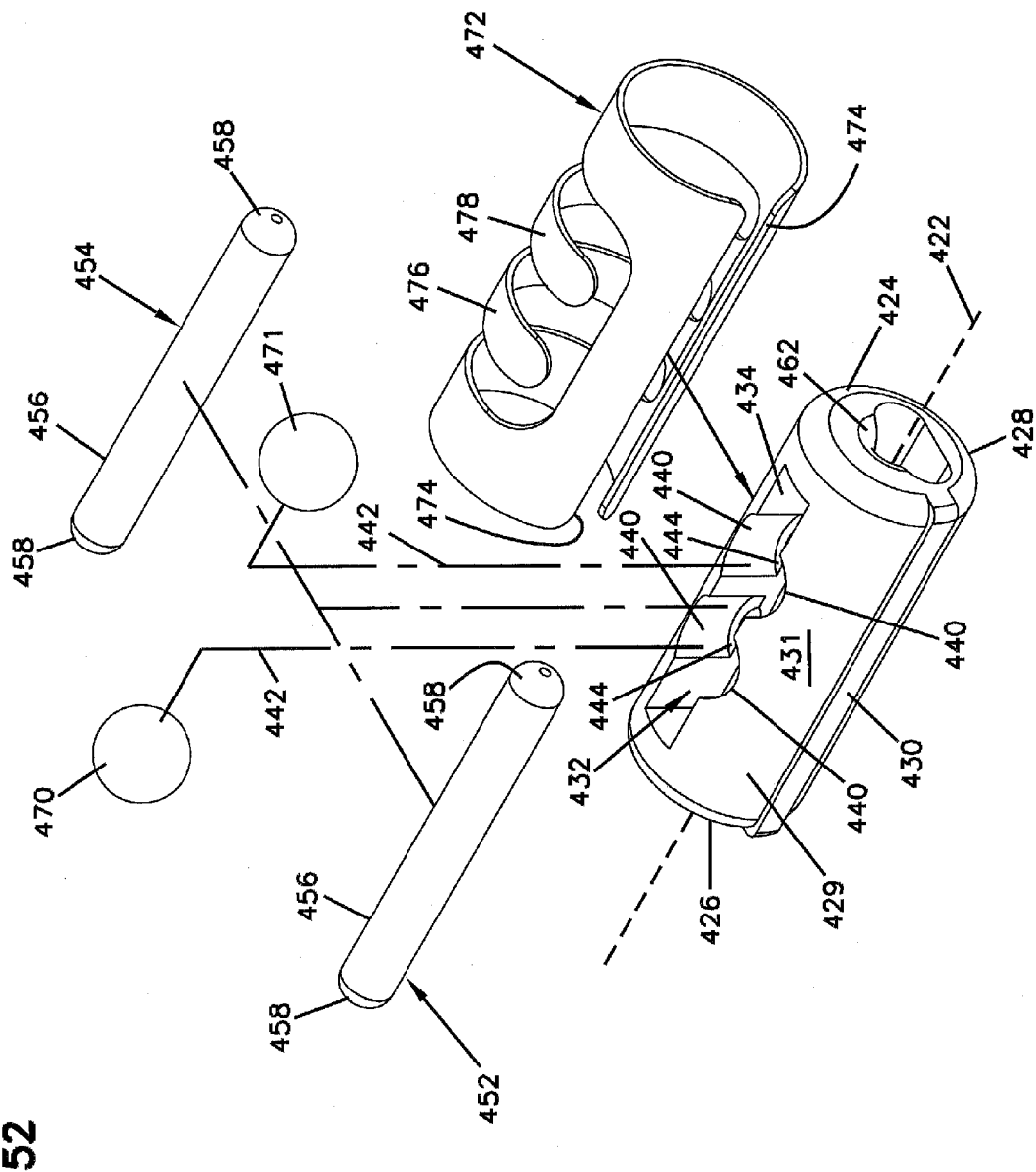
FIG. 52 is an exploded view of the optical fiber alignment device of FIG. 43.

FIGS. 43-53 illustrate another optical fiber alignment device 420 in accordance with the principles of the present disclosure. Referring to FIG. 52, the optical fiber alignment device includes an alignment housing 424 including first and second ends 426, 428. A fiber insertion axis 422 extends through the alignment housing 424 between the first and second ends 426, 428. The alignment housing 424 has a main body 429 that is elongated between the first and second ends 426, 428 and that includes an outer shape 431 that is cylindrical. The alignment housing 424 also includes a longitudinal rib 430 that projects laterally outwardly from the outer shape 431 of the main body 429 of the alignment housing 424.

Figure 53:
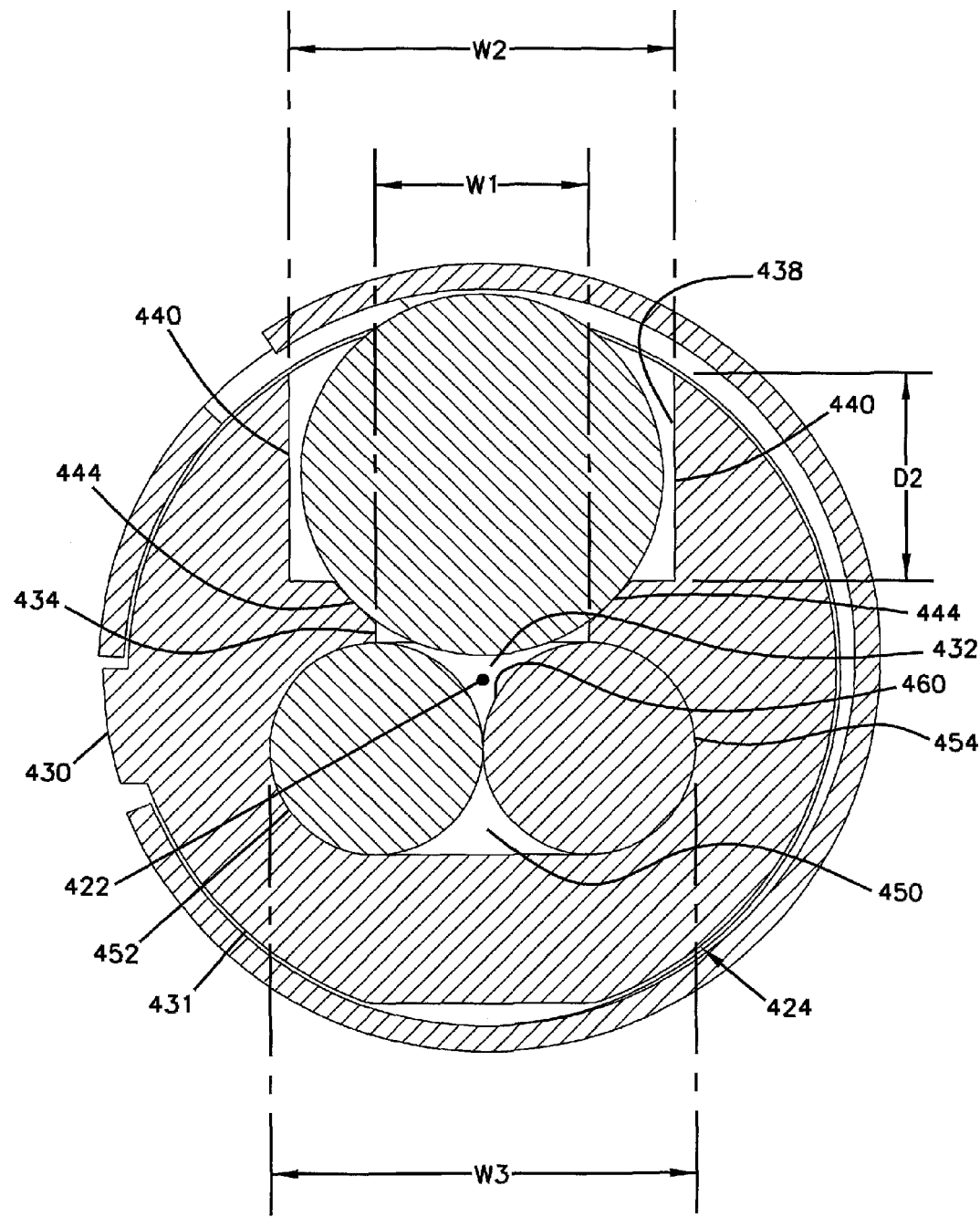
FIG. 53 is a transverse cross-sectional view of the optical fiber alignment device of FIG. 47 taken along section line 53-53.

The alignment housing 424 defines an internal chamber 432 (see FIGS. 51-53). The internal chamber 432 extends completely through the length of the alignment housing 424 from the first end 426 to the second end 428. In this way, optical fibers can be inserted along the fiber insertion axis 422 through the alignment housing 424. The internal chamber 432 includes an elongated access slot 434 having a length L1 (See FIG. 51), a depth D1 (see FIG. 51) and a width W1 (see FIG. 53). The length L1 extends along the length of the alignment housing 424. The depth D1 extends laterally (i.e., radially) into the alignment housing 424. The width W1 is transverse with respect to the depth D1 and the length L1. The internal chamber 432 also includes first and second ball-receiving pockets 436, 438 positioned along the length L1 of the elongated access slot 434. The first and second ball-receiving pockets 436, 438 each have a width W2 (see FIG. 53) that is larger than the width W1 of the elongated access slot 434. The first and second ball-receiving pockets 436,438 have depths D2 (see FIG. 53) that are parallel to the depth D1 of the elongated access slot 434. The first and second ball-receiving pockets 436,438 each include cylindrical pocket-defining surfaces 440 (see FIG. 52) that extend partially around ball insertion axes 442 (see FIG. 51) that are parallel to the depths D2. The pocket-defining surfaces 440 of each of the pockets 436,438 are positioned on opposite sides of the elongated access slot 434. The pocket-defining surfaces 440 of the first ball-receiving pocket 436 oppose one another, and the pocket-defining surfaces 440 of the second ball-receiving pocket 438 oppose one another. The first and second ball-receiving pockets 436, 438 also include ball seats 444 positioned at opposite sides of the elongated access slot 434. It will be appreciated that one ball seat 444 corresponds to each of the pocket-defining surfaces 440. The ball-seats are located at bottom ends of the first and second ball-receiving pockets 436, 438.

The internal chamber 432 also includes a rod receiving region 450 at the bottom of the depth D1 of the elongated access slot 434. The rod-receiving region 450 has a width W3 that is larger than the width W1 of the elongated access slot 434. The rod receiving region 450 extends generally along the entire length of the alignment housing 424.

The optical fiber alignment device 420 also includes first and second alignment rods 452, 454 (see FIG. 52) that fit within the rod-receiving region 450 of the alignment housing 424. The first and second alignment rods 452,454 mount parallel to one another within the rod-receiving region 450 and can be inserted into the rod-receiving region 450 through the elongated access slot 434. Each of the first and second alignment rods 452 includes an intermediate section 456 that is generally cylindrical in shape. Each of the first and second alignment rods 452 also has rounded ends 458. In the depicted embodiment, the rounded ends 458 are spherical in shape and form semi-spheres. The intermediate sections 456 of the first and second alignment rods 452, 454 cooperate to define a fiber alignment slot 460 that extends along the fiber insertion axis 422 through the alignment housing 424. The rounded ends 458 are positioned adjacent the first and second ends 426, 428 of the alignment housing 424. The alignment housing 424 defines partial funnel structures 462 positioned at the first and second ends 426, 428. The partial funnel structures 462 are positioned above the rounded ends 458 of the first and second alignment rods 452, 454. The partial funnel structures 462 form a tapered, transition that angles toward the fiber insertion axis 422 and the fiber alignment slot 460. The partial funnel structures 462 cooperate with the rounded ends 458 of the first and second alignment rods 454, 456 to define a tapered lead-in structure for guiding optical fibers toward the fiber insertion axis 422.

Similar to the fiber optic alignment device 20, the optical fiber alignment device 420 is configured for optically aligning the ends of two optical fibers desired to be mechanically and optically connected together. The optical fiber alignment device 420 further includes structure for urging the optical fibers desired to be optically connected together into contact with the fiber alignment slot 460 defined by the fiber alignment rods 452, 454. In the depicted embodiment, the fiber optical alignment device 420 includes first and second balls 470, 471 (i.e., fiber contact members) positioned respectively within the first and second ball-receiving pockets 436, 438. The balls 470, 471 are depicted as being spherical in shape. When inserted within their corresponding first and second ball-receiving pockets 436, 438, the first and second balls 470, 471 seat against the ball seats 444. Lower portions of the first and second balls 470, 471 extend downwardly into the rod-receiving region 450 and are aligned along the fiber alignment slot 460 and the fiber insertion axis 422. The pocket defining surfaces 440 surround portions of the balls 470,471 and maintain alignment of the balls 470, 471 with their respective ball insertion axes 442. In certain embodiments, the ball insertion axes 442 intersect the fiber insertion access 422 and the fiber alignment slot 460.

The optical fiber alignment device 420 further includes a biasing arrangement for urging the balls 470, 471 generally toward the fiber alignment slot 460. For example, the biasing arrangement can urge the balls 470, 471 in a direction transverse with respect to the fiber insertion axis 422. In the depicted embodiment, the biasing arrangement is shown including a clip 472 (e.g., a metal clip having elastic properties) mounted (e.g., snap fitted) over the main body 429 of the alignment housing 424. The clip 472 can have a transverse cross-sectional profile that is generally C-shaped. Ends 474 of the clip can abut against sides of the longitudinal rib 430 of the alignment housing 424. When the clip 472 is snapped or otherwise fitted over the alignment housing 424, the clip 472 functions to capture the first and second balls 470, 471 within their respective first and second ball-receiving pockets 436, 438. The clip 472 can include biasing structures such as first and second springs 476, 478 for respectively biasing the balls 470, 471 toward the fiber alignment slot 460. As depicted, the first and second springs 476, 478 are leaf springs having a cantilevered configuration with a base end integrally formed with a main body of the clip 472 and free ends that are not connected to the main body of the clip 472. In the depicted embodiment, the first and second springs 472, 474 both extend from their base ends to their free ends in the same rotational direction about the fiber insertion axis 422. The springs 476, 478 are defined by cutting or slitting the main body of the clip 472 so as to define slots in the main body of the clip 472 that surround three sides of each of the springs 476, 478.

In use of the optical fiber alignment device 420, two optical fibers desired to be optically connected together are inserted into the first and second ends 426, 428 of the alignment housing 424. As the optical fibers are inserted into the first and second ends 426, 428, the partial formal structure 426 combined with the rounded ends 458 of the first and second alignment rods 452, 454 cooperate to guide the ends of the optical fiber toward the fiber insertion axis 422. Continued insertion of the optical fibers causes the optical fibers to move along the fiber alignment slot 460 defined by the intermediate sections 456 of the first and second alignment rods 452, 454. As the optic fibers move along the fiber alignment slot 460, the optical fibers force their corresponding balls 470, 471 away from the fiber alignment slot 460 against the bias of the springs 476, 478. The optical fibers slide along the fiber alignment slot 460 until the end faces of the optical fibers are optically coupled to one another. In this configuration, the first and second spring 476, 478 and the first and second balls 470, 471 function to clamp or otherwise retain the optical fibers in the optically coupled orientation within the fiber alignment slot 460. In this way, the optical fibers are pressed within the fiber alignment slot 460 by the first and second balls 470, 471 such that axial alignment between the optical fibers is maintained.

What is claimed is:

1. An optical fiber alignment device comprising:
an alignment housing including first and second ends, the alignment housing defining a fiber insertion axis that extends through the alignment housing between the first and second ends, the alignment housing including a fiber alignment region at an intermediate location between the first and second ends;
first and second fiber alignment rods positioned within the alignment housing, the first and second fiber alignment rods cooperating to define a fiber alignment groove that extends along the fiber insertion axis, the first and second fiber alignment rods each having rounded ends positioned at the first and second ends of the alignment housing;
first and second fiber contact members positioned within the alignment housing; and
a biasing arrangement for urging the first and second fiber contact members generally toward the fiber alignment groove,
wherein the first and second ends of the alignment housing define partial funnels that cooperate with the rounded ends of the first and second fiber alignment rods to form fiber guides for guiding optical fibers toward the fiber insertion axis.

2. The optical fiber alignment device of claim 1, wherein the first and second fiber contact members comprise spheres.

3. The optical fiber alignment device of claim 1, wherein the first and second contact members comprise balls.

4. The optical fiber alignment device of claim 1, wherein the alignment housing is a one-piece part.

5. The optical fiber alignment device of claim 1, wherein the alignment housing is a one-piece molded part.

6. The optical fiber alignment device of claim 1, wherein the biasing arrangement includes a clip that mounts on the alignment housing such that the first and second contact members are captured within the alignment housing.

7. The optical fiber alignment device of claim 6, wherein the clip includes first and second springs that respectively apply biasing pressure to the first and second contact members.

8. The optical fiber alignment device of claim 7, wherein the first and second springs comprise leaf springs.

9. The optical fiber alignment device of claim 6, wherein the clip is C-shaped.

10. The optical fiber alignment device of claim 1, wherein the first and second contact members are first and second balls, wherein the alignment housing has a cylindrical outer surface, and wherein a resilient clip including a main body fits over the cylindrical outer surface of the alignment housing, the main body having a generally C-shaped transverse cross-sectional profile, the resilient clip also including first and second leaf springs having base ends integrally formed with the main body, the first and second leaf springs forming the biasing arrangement.

11. The optical fiber alignment device of claim 1, wherein the rounded ends are semi-spherical in shape.

12. The fiber optic alignment device of claim 1, wherein the alignment device is incorporated into a fiber optic adapter.

13. The fiber optic alignment claim 1, wherein the alignment device is incorporated into a converter for converting a ferrule-less connector into a ferruled connector.

14. An optical fiber alignment device comprising:
an alignment housing including first and second ends, the alignment housing defining a fiber insertion axis that extends through the alignment housing between the first and second ends, the alignment housing including a fiber alignment region at an intermediate location between the first and second ends, the alignment housing having a cylindrical outer surface;
first and second balls that fit within the alignment housing; and
a resilient clip including a main body that fits over the cylindrical outer surface of the alignment housing, the main body having a generally C-shaped transverse cross-sectional profile, the resilient clip also including first and second leaf springs having base ends integrally formed with the main body, the first and second leaf springs urging the first and second balls in a direction transverse with respect to the fiber insertion axis,
wherein the first and second ends of the alignment housing define partial funnel structures for guiding optical fibers toward the fiber insertion axis.

15. The optical fiber alignment device of claim 14, wherein the alignment housing defines an optical fiber alignment groove that extends within the alignment housing along the fiber insertion axis.

16. The optical fiber alignment device of claim 14, further comprising first and second fiber alignment rods positioned within the alignment housing, the first and second fiber alignment rods cooperating to define a fiber alignment groove that extends along the fiber insertion axis, the first and second fiber alignment rods each having rounded ends positioned at the first and second ends of the alignment housing.

17. The optical fiber alignment device of claim 16, wherein the rounded ends are semi-spherical in shape.

18. The optical fiber alignment device of claim 16, wherein the first and second ends of the alignment housing define partial funnels that cooperate with the rounded ends of the first and second fiber alignment rods to form fiber guides for guiding optical fibers toward the fiber insertion axis.

19. An optical fiber alignment device comprising:
an alignment housing including first and second ends, the first and second ends defining partial funnels, the alignment housing defining a fiber insertion axis that extends through the alignment housing between the first and second ends, the alignment housing including a fiber alignment region at an intermediate location between the first and second ends;
first and second fiber alignment rods positioned within the alignment housing, the first and second fiber alignment rods cooperating to define a fiber alignment groove that extends along the fiber insertion axis, the first and second fiber alignment rods each having rounded ends positioned at the first and second ends of the alignment housing, the partial funnels of the first and second ends of the alignment housing cooperating with the rounded ends of the first and second fiber alignment rods to form fiber guides for guiding optical fibers toward the fiber insertion axis; and
a biasing arrangement comprising a cantilevered configuration for urging first and second fiber contact members generally toward the fiber alignment groove.

* * * * *

UNITED STATES PATENT AND TRADEMARK OFFICE
CERTIFICATE OF CORRECTION

PATENT NO. : 9,575,263 B2  
APPLICATION NO. : 14/377189  
DATED : February 21, 2017  
INVENTOR(S) : Gurreri et al.

Page 1 of 1

It is certified that error appears in the above-identified patent and that said Letters Patent is hereby corrected as shown below:

On the Title Page

Item (56) Column 2 References Cited, OTHER PUBLICATIONS: insert --International Search Report for International Application No. PCT/EP2013/052325 mailed 13 August 2013 (4 pages).-- in appropriate order.

Signed and Sealed this  
Fifteenth Day of May, 2018

Andrei Iancu  
*Director of the United States Patent and Trademark Office*